(12) United States Patent
Takeda et al.

(10) Patent No.: US 11,844,110 B2
(45) Date of Patent: Dec. 12, 2023

(54) TERMINAL, RADIO COMMUNICATION METHOD, AND BASE STATION FOR TRANSMISSION OR RECEPTION OF AN UPLINK CHANNEL OR AN UPLINK SIGNAL

(71) Applicant: NTT DOCOMO, INC., Tokyo (JP)

(72) Inventors: Kazuaki Takeda, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 39 days.

(21) Appl. No.: 16/646,082

(22) PCT Filed: Sep. 11, 2017

(86) PCT No.: PCT/JP2017/032722
§ 371 (c)(1),
(2) Date: Mar. 10, 2020

(87) PCT Pub. No.: WO2019/049384
PCT Pub. Date: Mar. 14, 2019

(65) Prior Publication Data
US 2020/0288501 A1    Sep. 10, 2020

(51) Int. Cl.
*H04W 74/08* (2009.01)
*H04L 5/00* (2006.01)
(Continued)

(52) U.S. Cl.
CPC ....... *H04W 74/0833* (2013.01); *H04L 5/0048* (2013.01); *H04L 5/14* (2013.01); *H04W 72/12* (2013.01)

(58) Field of Classification Search
CPC . H04L 1/16; H04L 5/0048; H04L 5/14; H04L 5/1469; H04W 72/12; H04W 72/0446; H04W 74/0833
See application file for complete search history.

(56) References Cited

U.S. PATENT DOCUMENTS

2012/0182908 A1* 7/2012 Pan ................. H04W 72/23
370/280
2013/0194908 A1* 8/2013 Gao ................. H04L 5/0091
370/329

(Continued)

OTHER PUBLICATIONS

International Search Report issued in PCT/JP2017/032722 dated Nov. 28, 2017 (2 pages).

(Continued)

*Primary Examiner* — Ian N Moore
*Assistant Examiner* — Sun Jong Kim
(74) *Attorney, Agent, or Firm* — Osha Bergman Watanabe & Burton LLP

(57) ABSTRACT

A terminal, as disclosed, includes a receiver that receives information about transmission conditions for an uplink (UL) channel or for a UL signal. The terminal further includes a processor that, when dual connectivity using a first radio access technology and a second radio access technology is configured and when a cell using frequency division duplexing (FDD) is configured for the first radio access technology, controls a transmission of the UL channel or of the UL signal in the cell using the FDD, based on the information about the transmission conditions and a UL or downlink (DL) configuration. A radio communication method and a base station are disclosed as well.

10 Claims, 18 Drawing Sheets

(51) Int. Cl.
*H04L 5/14* (2006.01)
*H04W 72/12* (2023.01)

(56) References Cited

U.S. PATENT DOCUMENTS

| | | | | |
|---|---|---|---|---|
| 2013/0308550 A1* | 11/2013 | Yin | H04L 1/1861 | 370/329 |
| 2013/0343307 A1* | 12/2013 | Desai | H04W 74/08 | 370/329 |
| 2014/0036810 A1* | 2/2014 | Harrison | H04L 5/0094 | 370/329 |
| 2014/0112254 A1* | 4/2014 | Lindoff | H04W 74/002 | 370/328 |
| 2014/0242963 A1* | 8/2014 | Novlan | H04W 48/16 | 455/418 |
| 2015/0215079 A1* | 7/2015 | Park | H04L 5/0055 | 370/280 |
| 2016/0081039 A1* | 3/2016 | Lindoff | H04W 52/244 | 455/450 |
| 2016/0366681 A1* | 12/2016 | Dinan | H04L 5/0091 | |
| 2016/0381680 A1* | 12/2016 | Yasukawa | H04W 72/1289 | 370/280 |
| 2017/0019944 A1* | 1/2017 | Teng | H04L 5/0055 | |
| 2018/0332478 A1* | 11/2018 | Noh | H04L 5/0092 | |

OTHER PUBLICATIONS

Written Opinion of the International Searching Authority issued in PCT/JP2017/032722 dated Nov. 28, 2017 (4 pages).
Samsung; "UL Sharing Between LTE and NR"; 3GPP TSG RAN WG1 #90, R1-1713670; Prague, Czech Republic; Aug. 21-25, 2017 (3 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
Extended European Search Report issued in counterpart European Patent Application No. 17924677.2, dated Jun. 7, 2021 (9 pages).
Huawei, HiSilicon; "Considerations of NR UL operation for LTE-NR coexistence"; 3GPP TSG RAN WG1 Meeting #88bis, R1-1704199; Spokane, USA; Apr. 3-7, 2017 (7 pages).
Office Action issued in the counterpart Japanese Patent Application No. 2019-540744, dated Nov. 30, 2021 (8 pages).
China Unicom; "Consideration on Improvement of SR Resource Utilization"; 3GPP TSG-RAN WG2 Meeting #77bis, R2-121432; Jeju, Korea; Mar. 26-30, 2012 (2 pages).
Decision for Refusal issued in the counterpart Japanese Patent Application No. 2019-540744, dated Jun. 14, 2022 (6 pages).
Office Action issued in counterpart Chinese Patent Application No. 201780096722.3 dated Jan. 11, 2023 (17 pages).
NTT Docomo, Inc .; "Views on single UL transmission and UL sharing"; 3GPP TSG RAN WG1 NR Ad-Hoc#2, R1-1711132; Qingdao, P.R. China; Jun. 27-30, 2017 (5 pages).
Office Action issued in counterpart Chinese Patent Application No. 201780096722.3 dated Jun. 7, 2023 (22 pages).

* cited by examiner

FIG. 3

| UL/DL CONFIGURATION | SUBFRAME n | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

D: DL SUBFRAME
U: UL SUBFRAME
S: SPECIAL SUBFRAME

| UL/DL CONFIGURA-TION | \multicolumn{10}{c}{SUBFRAME n} | | | | | | | | | |
|---|---|---|---|---|---|---|---|---|---|---|
|  | 0 | 1 | 2 | 3 | 4 | 5 | 6 | 7 | 8 | 9 |
| 0 | - | - | 6 | - | 4 | - | - | 6 | - | 4 |
| 1 | - | - | 7,6 | 4 | - | - | - | 7,6 | 4 | - |
| 2 | - | - | 8,7,4,6 | - | - | - | - | 8,7,4,6 | - | - |
| 3 | - | - | 7,6,11 | 6,5 | 5,4 | - | - | - | - | - |
| 4 | - | - | 12,8,7,11 | 6,5,4,7 | - | - | - | - | - | - |
| 5 | - | - | 13,12,9,8,7,5,4,11,6 | - | - | - | - | - | - | - |
| 6 | - | - | 7 | 7 | 5 | - | - | 7 | 7 | - |

FIG. 4

| UL/DL CONFIGURA-TION | SUBFRAME n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | - | - | - | 4 | 6 | - | - | - |
| 1 | - | 6 | - | - | 4 | - | 6 | - | - | 4 |
| 2 | - | - | - | 4 | - | - | - | - | 4 | - |
| 3 | 4 | - | - | - | - | - | - | - | 4 | 4 |
| 4 | - | - | - | - | - | - | - | - | 4 | 4 |
| 5 | - | - | - | - | - | - | - | - | 4 | - |
| 6 | 7 | 7 | - | - | - | 7 | 7 | - | - | 5 |

FIG. 5

| UL/DL CONFIGURA-TION | SUBFRAME n | | | | | | | | | |
|---|---|---|---|---|---|---|---|---|---|---|
| | 0 | 1 | 2 | 3 | 4 | 5 | 6 | 7 | 8 | 9 |
| 0 | - | - | 6, 5 | 5, 4 | 4 | - | - | 6, 5 | 5, 4 | 4 |
| 1 | - | - | 7, 6 | 6, 5, 4 | - | - | - | 7, 6 | 6, 5, 4 | - |
| 2 | - | - | 8, 7, 6, 5, 4 | - | - | - | - | 8, 7, 6, 5, 4 | - | - |
| 3 | - | - | 11, 10, 9, 8, 7, 6 | 6, 5 | 5, 4 | - | - | - | - | - |
| 4 | - | - | 12, 11, 10, 9, 8, 7 | 7, 6, 5, 4 | - | - | - | - | - | - |
| 5 | - | - | 13, 12, 11, 10, 9, 8, 7, 6, 5, 4 | - | - | - | - | - | - | - |
| 6 | - | - | 8, 7 | 7, 6 | 6, 5 | - | - | 7 | 7, 6, 5 | - |

FIG. 6

UE-SPECIFIC SR PERIODICITY AND SUBFRAME-OFFSET CONFIGURATION

| SR configuration Index $I_{SR}$ | SR periodicity (ms) $SR_{PERIODICITY}$ | SR subframe offset $N_{OFFSET,SR}$ |
|---|---|---|
| 0 - 4 | 5 | ISR |
| 5 - 14 | 10 | ISR - 5 |
| 15 - 34 | 20 | ISR - 15 |
| 35 - 74 | 40 | ISR - 35 |
| 75 - 154 | 80 | ISR - 75 |
| 155 - 156 | 2 | ISR - 155 |
| 157 | 1 | ISR - 157 |

FIG. 8

RANDOM ACCESS CONFIGURATION FOR FDD (FRAME STRUCTURE TYPE 1)

| PRACH Configuration Index | Preamble Format | System Frame number | Subframe number | PRACH Configuration Index | Preamble Format | System Frame number | Subframe number |
|---|---|---|---|---|---|---|---|
| 0 | 0 | Even | 1 | 32 | 2 | Even | 1 |
| 1 | 0 | Even | 4 | 33 | 2 | Even | 4 |
| 2 | 0 | Even | 7 | 34 | 2 | Even | 7 |
| 3 | 0 | Any | 1 | 35 | 2 | Any | 1 |
| 4 | 0 | Any | 4 | 36 | 2 | Any | 4 |
| 5 | 0 | Any | 7 | 37 | 2 | Any | 7 |
| 6 | 0 | Any | 1, 6 | 38 | 2 | Any | 1, 6 |
| 7 | 0 | Any | 2, 7 | 39 | 2 | Any | 2, 7 |
| 8 | 0 | Any | 3, 8 | 40 | 2 | Any | 3, 8 |
| 9 | 0 | Any | 1, 4, 7 | 41 | 2 | Any | 1, 4, 7 |
| 10 | 0 | Any | 2, 5, 8 | 42 | 2 | Any | 2, 5, 8 |
| ... | | | | ... | | | |

FIG. 9

RANDOM ACCESS CONFIGURATION FOR TDD (FRAME STRUCTURE TYPE 2)

| PRACH Configuration Index | Preamble Format | Density Per 10ms $D_{RA}$ | Version $Y^{RA}$ | PRACH Configuration Index | Preamble Format | Density Per 10ms $D_{RA}$ | Version $Y^{RA}$ |
|---|---|---|---|---|---|---|---|
| 0 | 0 | 0.5 | 0 | 32 | 2 | 0.5 | 2 |
| 1 | 0 | 0.5 | 1 | 33 | 2 | 1 | 0 |
| 2 | 0 | 0.5 | 2 | 34 | 2 | 1 | 1 |
| 3 | 0 | 1 | 0 | 35 | 2 | 2 | 0 |
| 4 | 0 | 1 | 1 | 36 | 2 | 3 | 0 |
| 5 | 0 | 1 | 2 | 37 | 2 | 4 | 0 |
| 6 | 0 | 2 | 0 | 38 | 2 | 5 | 0 |
| 7 | 0 | 2 | 1 | 39 | 2 | 6 | 0 |
| 8 | 0 | 2 | 2 | 40 | 3 | 0.5 | 1 |
| 9 | 0 | 3 | 0 | 41 | 3 | 0.5 | 2 |
| 10 | 0 | 3 | 1 | 42 | 3 | 0.5 | 2 |
| ... | ... | ... | ... | ... | ... | ... | ... |

FIG. 10

SRS SUBFRAME CONFIGURATION FOR FDD (FRAME STRUCTURE TYPE 1)

| Srs-SubframeConfig | Binary | Configuration Period $T_{SFC}$ (subframes) | Transmission offset $\Delta_{SFC}$ (subframes) |
|---|---|---|---|
| 0 | 0000 | 1 | {0} |
| 1 | 0001 | 2 | {0} |
| 2 | 0010 | 2 | {1} |
| 3 | 0011 | 5 | {0} |
| 4 | 0100 | 5 | {1} |
| 5 | 0101 | 5 | {2} |
| 6 | 0110 | 5 | {3} |
| 7 | 0111 | 5 | {0, 1} |
| 8 | 1000 | 5 | {2, 3} |
| 9 | 1001 | 10 | {0} |
| 10 | 1010 | 10 | {1} |
| 11 | 1011 | 10 | {2} |
| 12 | 1100 | 10 | {3} |
| 13 | 1101 | 10 | {0, 1, 2, 3, 4, 6, 8} |
| 14 | 1110 | 10 | {0, 1, 2, 3, 4, 5, 6, 8} |
| 15 | 1111 | reserved | reserved |

FIG. 11

SRS SUBFRAME CONFIGURATION FOR TDD (FRAME STRUCTURE TYPE 2)

| Srs-SubframeConfig | Binary | Configuration Period $T_{SFC}$ (subframes) | Transmission offset $\Delta_{SFC}$ (subframes) |
|---|---|---|---|
| 0 | 0000 | 5 | {1} |
| 1 | 0001 | 5 | {1, 2} |
| 2 | 0010 | 5 | {1, 3} |
| 3 | 0011 | 5 | {1, 4} |
| 4 | 0100 | 5 | {1, 2, 3} |
| 5 | 0101 | 5 | {1, 2, 4} |
| 6 | 0110 | 5 | {1, 3, 4} |
| 7 | 0111 | 5 | {1, 2, 3, 4} |
| 8 | 1000 | 10 | {1, 2, 6} |
| 9 | 1001 | 10 | {1, 3, 6} |
| 10 | 1010 | 10 | {1, 6, 7} |
| 11 | 1011 | 10 | {1, 2, 6, 8} |
| 12 | 1100 | 10 | {1, 3, 6, 9} |
| 13 | 1101 | 10 | {1, 4, 6, 7} |
| 14 | 1110 | reserved | reserved |
| 15 | 1111 | reserved | reserved |

FIG. 12

TERMINAL, RADIO COMMUNICATION METHOD, AND BASE STATION FOR TRANSMISSION OR RECEPTION OF AN UPLINK CHANNEL OR AN UPLINK SIGNAL

TECHNICAL FIELD

The present invention relates to a user terminal and a radio communication method in next-generation mobile communication systems.

BACKGROUND ART

In the UMTS (Universal Mobile Telecommunications System) network, the specifications of long-term evolution (LTE) have been drafted for the purpose of further increasing high speed data rates, providing lower delays and so on (see non-patent literature 1). Also, the specifications of LTE-A (also referred to as "LTE-Advanced," "LTE Rel. 10 to 13," etc.) have been drafted for further broadbandization and increased speed beyond LTE (also referred to as "LTE Rel. 8 or 9"), and successor systems of LTE (also referred to as, for example, "FRA (Future Radio Access)," "5G (5th generation mobile communication system)," "NR (New RAT (Radio Access Technology)," "LTE Rel. 14 and later versions," etc.) are under study.

In existing LTE systems (for example, LTE Rel. 10 and later versions), carrier aggregation (CA) to integrate a number of carriers (component carriers (CCs), cells and so forth) is introduced in order to achieve broadbandization. Each carrier is formed with the system bandwidth of LTE Rel. 8 as one unit. In addition, in CA, multiple CCs under the same radio base station (eNB (eNodeB)) are configured in a user terminal (UE (User Equipment)).

Meanwhile, in existing LTE systems (for example, LTE Rel. 12 and later versions), dual connectivity (DC), in which a number of cell groups (CGs) formed by different radio base stations are configured in a user terminal, is also introduced. Each cell group is comprised of at least one carrier (also referred to as "CC," "cell," etc.). In DC, a number of carriers of different radio base stations are integrated, so that DC is also referred to as "inter-eNB CA."

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall Description; Stage 2 (Release 8)," April, 2010

SUMMARY OF INVENTION

Technical Problem

In future radio communication systems (for example, 5G, NR, etc.), Radio access technologies (RATs) (also referred to as "5G," "NR," "second RAT," etc.) that are different from existing RATs (also referred to as "LTE," "first RAT," etc.) will be adopted. Also, as for the mode of operation in future radio communication systems, stand-alone mode, which operates independently without coordinating with existing RATs, and non-stand-alone mode (NSA), which operates by coordinating with existing RATs, are anticipated.

In non-stand-alone radio communication systems (also referred to as "NR NSA" and the like), multiple carriers of different RATs (or a number of cell groups that are each comprised of multiple carriers (cells) of different RATs) are configured in a user terminal (also referred to as "UE (User Equipment)," "NR UE," etc.). Furthermore, envisaging non-stand-alone radio communication systems, research is underway to allow a user terminal to simultaneously connect with multiple carriers of different RATs (also referred to as "multiple cell groups," "multiple cells," "multiple CCs," etc.) (dual connectivity (DC)).

However, in non-stand-alone radio communication systems, even when an attempt is made to connect with a number of carriers of different RATs simultaneously and transmit multiple UL signals of different RATs using each of these multiple carriers, there is a high possibility that these multiple UL signals cannot be transmitted properly.

The present invention has been made in view of the above, and it is therefore an object of the present invention to provide a user terminal and a radio communication method, whereby multiple UL signals of varying RATs can be transmitted properly in non-stand-alone radio communication systems.

Solution to Problem

In accordance with one aspect of the present invention, a user terminal has a transmission section that transmits a first uplink signal (UL) of a first radio access technology (RAT) and a second UL signal of a second RAT, at different times, the first RAT controlling a timing for transmitting delivery acknowledgment information in frequency division duplexing (FDD) and/or a timing for scheduling UL data, based on a UL/DL configuration to be used in time division duplexing (TDD), and a control section that controls transmission of at least one of a scheduling request (SR), a random access preamble and a sounding reference signal (SRS) in the first RAT based on at least a UL transmission timing specified by the UL/DL configuration.

Advantageous Effects of Invention

According to the present invention, a user terminal can properly transmit multiple UL signals of different RATs in non-stand-alone radio communication systems.

BRIEF DESCRIPTION OF DRAWINGS

FIG. 3 is a diagram to show examples of UL/DL configurations for use in TDD;

FIG. 4 is a diagram to show examples of timings for transmitting ACKs/NACKs in TDD;

FIG. 5 is a diagram to show examples of timings for scheduling PUSCH in TDD;

FIG. 6 is a diagram to show examples of timings for transmitting ACKs/NACKs in an FDD-SCell in TDD-FDD CA;

FIG. 8 is a diagram to show SR configurations of scheduling requests;

FIG. 9 is a diagram to show random access channel configurations configured for FDD;

FIG. 10 is a diagram to show random access channel configurations configured for TDD;

FIG. 11 is a diagram to show SRS configurations configured for FDD;

FIG. 12 is a diagram to show SRS configurations to be configured for TDD;

DESCRIPTION OF EMBODIMENTS

Future radio communication systems, configurations for allowing a user terminal to connect with DL carriers of a number of RATs simultaneously, while the UL carrier that can transmit UL signals is switched among UL carriers of these multiple RATs, over time, are under study.

Figure 1:
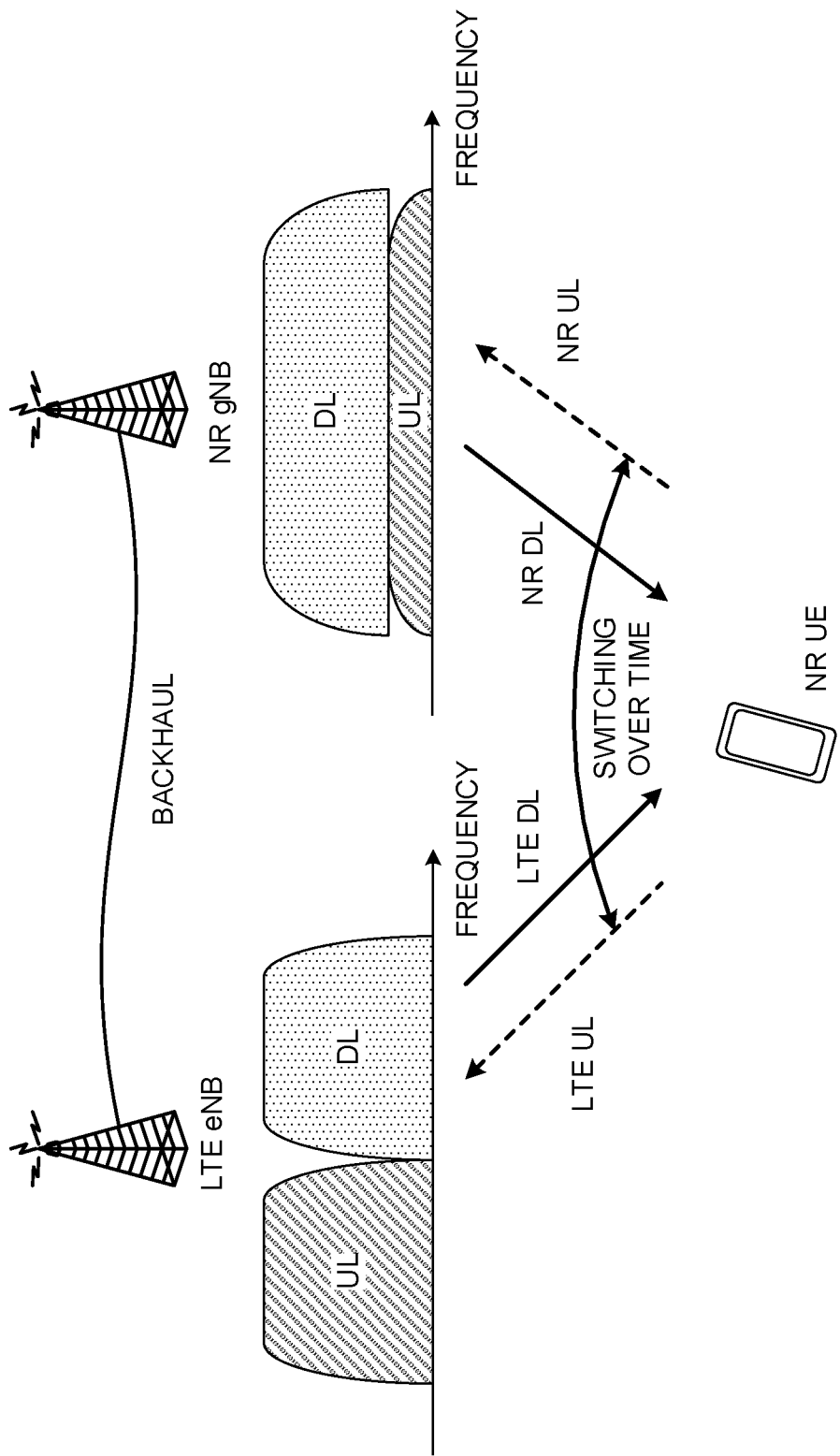
FIG. 1 is a diagram to show an example of a non-stand-alone radio communication system.

FIG. 1 is a diagram to show an example of a non-stand-alone radio communication system. As shown in FIG. 1, one or more carriers for LTE (also referred to as "LTE carriers," "LTE cells," "first carriers," etc.) and one or more carriers for NR (also referred to as "NR carriers," "NR cells," "second carriers," etc.) are configured in a user terminal (NR UE).

These one or more LTE carriers (also referred to as a "cell group," "LTE cell group," "primary cell group (PCG)," etc.) may include one or more DL carriers (also referred to as "LTE DL carriers," "first DL carriers," etc.) and/or one or more UL carriers (also referred to as "LTE UL carriers," "first UL carriers," etc.).

In addition, these one or more NR carriers (also referred to as "cell group," "NR cell group," "secondary cell group (SCG)," etc.) may include one or more DL carriers (also referred to as "NR DL carriers," "second DL carriers," etc.) and/or one or more UL carriers (also referred to as "NR UL carriers," "second UL carriers," etc.).

As shown in FIG. 1, one or more LTE carriers and one or more NR carriers are all allocated to different frequency bands. An LTE carrier may be allocated to a relatively low frequency band such as, for example, at least one of 800 MHz, 1.7 GHz and 2.1 GHz. Also, an NR carrier may be allocated to a relatively high frequency band of, for example, 3 GHz or higher.

For example, referring to FIG. 1, frequency division duplexing (FDD) is applied to LTE, so that the LTE UL carrier and the LTE DL carrier are provided at different frequencies. Also, time division duplexing (TDD) is applied to NR, so that the NR UL carrier and the NR DL carrier are provided at the same frequency. Note that FIG. 1 is simply an example, and it is equally possible to apply TDD to LTE and apply FDD to NR. Also, although a case is shown here in which one LTE carrier and one NR carrier are present, two or more LTE carriers and two or more NR carriers may be present as well.

Furthermore, in FIG. 1, the radio base station of LTE (also referred to as "eNodeB (eNB)," "LTE eNB," "LTE base station," etc.) and the radio base station of NR (also referred to as "gNodeB (gNB)," "NR gNB," "NR base station," etc.) are connected via a backhaul link (for example, a cable link such as the X2 interface, or a radio link). Also, the LTE base station and the NR base station may be installed at the same location, or may be installed at different locations that are geographically apart.

In FIG. 1, the LTE base station and the NR base station each have a MAC (Medium Access Control) entity. A MAC entity refers to a process entity where MAC layer processing takes place. MAC layer processing includes, for example, at least one of multiplexing of logical channels, retransmission control (HARQ (Hybrid Automatic Repeat reQuest)), scheduling, multiplexing of data across multiple carriers (CCs) and demultiplexing of the data.

Referring to FIG. 1, the user terminal (NR UE) connects with the LTE DL carrier and the NR DL carrier simultaneously (dual connectivity). Consequently, the user terminal can receive an LTE DL signal and an NR DL signal from the LTE base station and the NR base station, simultaneously, by using the LTE DL carrier and the NR DL carrier, respectively.

In addition, the user terminal might transmit a UL signal of LTE (also referred to as an "LTE UL signal," "first UL signal," etc.) and a UL signal of NR (also referred to as an "NR UL signal," "second UL signal," etc.), simultaneously, by using the LTE UL carrier and the NR UL carrier, respectively. However, when the LTE UL carrier and the NR UL carrier run dual connectivity, there is a possibility that LTE UL signals and NR UL signals cannot be transmitted properly by using the LTE UL carrier and the NR UL carrier, respectively.

For example, the coverage of a high frequency band is smaller than the coverage of a low frequency band. It then follows that, when an LTE UL signal and an NR UL signal are transmitted simultaneously by using an LTE UL carrier of a low frequency band and an NR UL carrier of a high frequency band, respectively, there is a problem that the coverage of the NR UL signal becomes smaller than the coverage of the LTE UL signal.

Also, when the user terminal transmits an LTE UL signal and an NR UL signal simultaneously by using an LTE UL carrier of a low frequency band (for example, 1.7 GHz) and an NR UL carrier of a high frequency band (for example, 3.5 GHz), respectively, there is a possibility that the performance of DL will decline due to inter-modulation that takes place in the user terminal.

Consequently, the user terminal is expected to switch and control the transmission of the LTE UL signal using the LTE UL carrier and the transmission of the NR UL signal using the NR UL carrier, over time. That is, the user terminal transmits the LTE UL signal and the NR UL signal at different times, by using the LTE UL carrier and the NR UL carrier, respectively.

In the non-stand-alone radio communication system shown in FIG. 1, the transmission and/or receipt (transmission/receipt) of LTE DL signals and LTE UL signals are confined within the LTE carriers, and the transmission/receipt of NR DL signals and NR UL signals are confined within the NR carriers.

Figure 2:
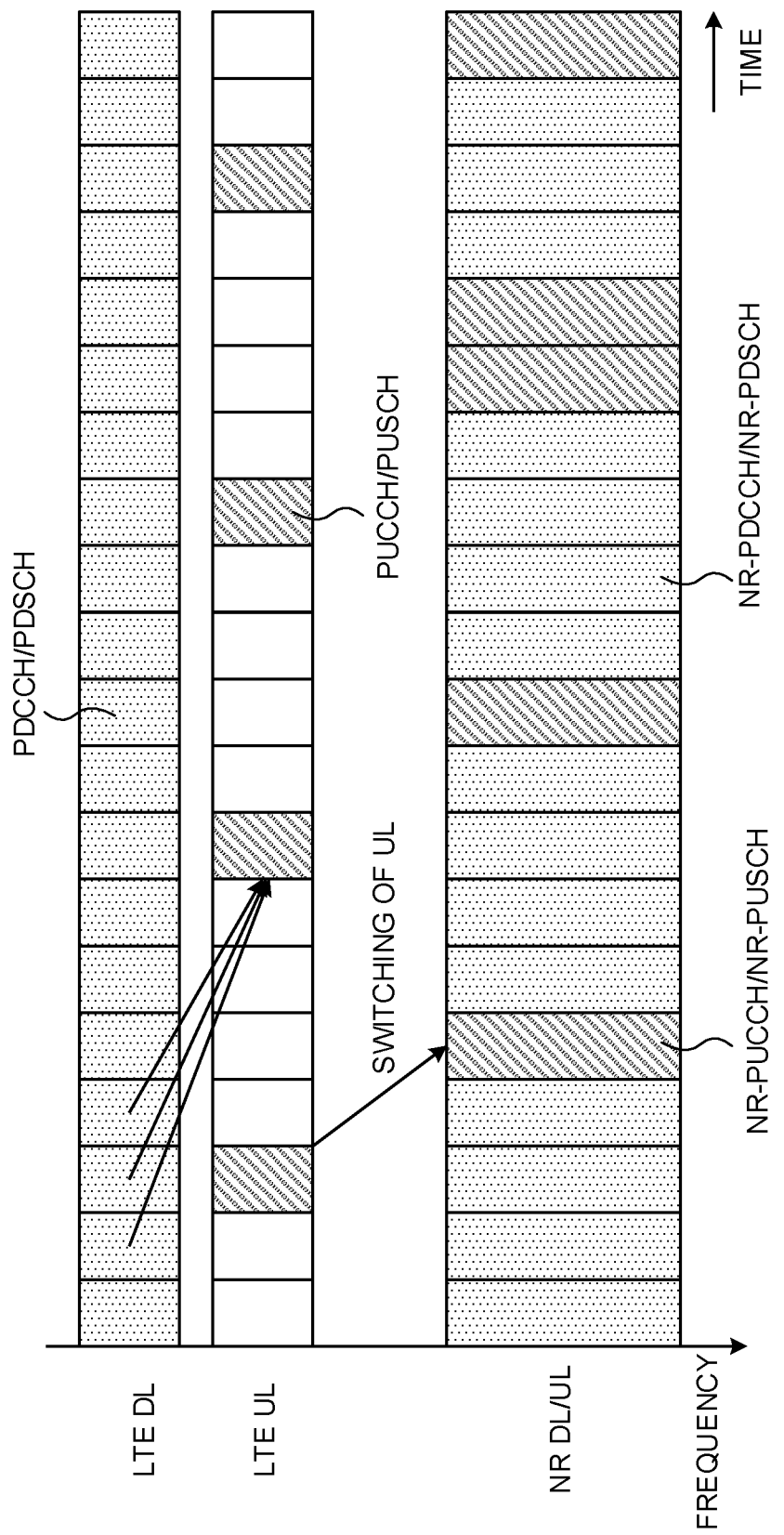
FIG. 2 is a diagram to show an example of switching between an LTE UL carrier and an NR UL carrier.

FIG. 2 is a diagram to show an example of switching between an LTE UL carrier and an NR UL carrier. Similar to FIG. 1, with FIG. 2, an example case will be described in which FDD is used in LTE and TDD is used in NR. Referring to FIG. 2, the time for transmitting LTE UL signals in the LTE UL carrier (also referred to as the "first time" and the like) and the time for transmitting NR UL signals in the NR UL carrier (also referred to as the "second time" and the like) may be switched around based on predetermined rules.

When FDD is used in existing LTE systems (for example, LTE Rel. 13 and earlier versions), a user terminal transmits delivery acknowledgement information (also referred to as an "A/N," an "HARQ-ACK," an "HARQ-ACK bit," an "A/N codebook," etc.) in response to a PDSCH in subframe #n+k, which is located k (k=4) milliseconds (ms) after subframe #n, in which the PDSCH is received. Also, the user terminal transmits PUSCH in subframe #n+k, which is located k (k=4) milliseconds (ms) after subframe #n, in which DCI (UL grant) is received.

On the other hand, in the non-stand-alone radio communication system shown in FIG. 1, even if FDD is used in LTE, as shown in FIG. 2, the time (for example, subframes or TTIs) LTE UL signals can be transmitted using the LTE UL carrier is limited. For example, FIG. 2 shows a case where TTIs that can transmit LTE UL signals are provided in a predetermined cycle (here, every four TTIs), and the transmission of LTE UL signals is suspended in the rest of the TTIs.

<Transmission Time of LTE UL Signals>

The time LTE UL signals can be transmitted (also referred to as the "first time," the "timing for transmitting LTE UL signals," etc.) may be determined based on predetermined rules. For example, the time LTE UL signals can be transmitted may be determined based on UL/DL configurations (UL-DL configurations) for use in TDD in existing LTE systems (for example, LTE Rel. 13 and earlier versions). A UL/DL configuration shows the configuration (ratio) of UL subframes and DL subframes in a radio frame.

FIG. 3 is a diagram to show examples of UL/DL configurations for use in TDD. For example, FIG. 3 shows seven UL/DL configurations 0 to 6, which show the configurations of UL subframes and DL subframes. Note that the UL/DL configurations shown in FIG. 3 are simply examples and are by no means limiting, and new UL/DL configurations for FDD may be provided. Also, referring to FIG. 3, a special subframe refers to a subframe for switching between a DL subframe and a UL subframe, and may be used primarily in DL communication.

When FDD is used in LTE, as shown in FIG. 1, the time LTE UL signals can be transmitted using the LTE UL carrier may be the same as the timing of UL subframes in one of the UL/DL configurations. Even when FDD is used in LTE, the indices of UL/DL configurations for use in TDD may be reported to the user terminal as information that indicates timings for transmitting LTE UL signals in the LTE UL carrier.

<Timing for Transmitting ACK/NACK in Response to LTE DL Signals>

When the timings for transmitting LTE UL signals in the FDD LTE UL carrier are indicated by UL/DL configurations for TDD, the timing for transmitting an ACK/NACK in response to an LTE DL signal received in the FDD LTE DL carrier may be determined based on the timing for transmitting an ACK/NACK in TDD.

FIG. 4 is a diagram to show examples of timings for transmitting ACKs/NACKs in TDD. For example, assuming that an ACK/NACK in response to the LTE DL signal of subframe #n-k is transmitted in subframe #n, FIG. 4 shows the value of k for every UL/DL configuration (see FIG. 3). The timing for transmitting an ACK/NACK in response to an LTE DL signal received in the FDD LTE DL carrier may be indicated using this value of k.

<Timing for Scheduling LTE UL Signals>

When the timings for transmitting LTE UL signals in the FDD LTE UL carrier are indicated by UL/DL configurations for TDD, the timing for scheduling an LTE UL signal in the FDD LTE UL carrier may be determined based on a timing for scheduling PUSCH in TDD.

FIG. 5 is a diagram to show examples of timings for scheduling PUSCH in TDD. For example, assuming that the LTE UL signal of subframe #n+k is scheduled in subframe #n, FIG. 5 shows the value of k for every UL/DL configuration (see FIG. 3). The timing for scheduling an LTE UL signal to transmit in the FDD LTE UL carrier may be indicated using this value of k.

<DCI>

When the timings for transmitting LTE UL signals in the FDD LTE UL carrier are indicated by UL/DL configurations, even if DCI to schedule FDD LTE DL signals (which is also referred to as "DL assignment," "DCI format 1/1A/1B/1D/2/2A to 2D," etc.) is used, the number of bits to constitute the HARQ process number (HPN) field in this DCI (for example, four bits, which is the same as in TDD) may be greater than when FDD is used (for example, three bits). The HPN field indicates the HPN, which is used to control the retransmission of LTE DL signals and/or LTE UL signals.

Also, when the timings for transmitting LTE UL signals in the FDD LTE UL carrier are indicated by UL/DL configurations, the DCI that is used to schedule LTE DL signals and/or LTE UL signals in FDD may contain a DAI (Downlink Assignment Index).

Alternatively, when CA is performed on a TDD carrier and an FDD carrier, the primary cell (PCell) uses TDD and the secondary cell (SCell) uses FDD (which may be referred to as "TDD-FDD CA with TDD-PCell"), the timing for transmitting an ACK/NACK in response to an LTE DL signal received in the FDD LTE DL carrier may be determined based on the timing for transmitting an ACK/NACK in response to an LTE DL signal received in the secondary cell.

FIG. 6 is a diagram to show examples of timings for transmitting ACKs/NACKs in the FDD-SCell in TDD-FDD CA. For example, FIG. 6, assuming that an ACK/NACK in response to the LTE DL signal of subframe #n-k is transmitted in subframe #n, shows the value of k for every UL/DL configuration. The timing for transmitting an ACK/NACK in response to an LTE DL signal received in the FDD LTE DL carrier may be indicated using this value of k.

Given the timings for transmitting ACKs/NACKs in TDD shown in FIG. 4, there is no prospect of receiving LTE DL signals at timings LTE UL signals are transmitted. Meanwhile, as shown in FIG. 2, in FDD, LTE DL signals can be received at timings LTE UL signals are transmitted. By using the timings for transmitting ACKs/NACKs for the FDD-SCell in TDD-FDD CA shown in FIG. 6, the LTE base station can transmit LTE DL signals even at the timings for transmitting LTE UL signals shown in FIG. 2.

<Timing for Transmitting NR UL Signal>

The time NR UL signals can be transmitted (LTE NR signal transmission timings) has only to be different from the timings for transmitting LTE UL signals. That is, the time NR UL signals can be transmitted may be determined based on UL subframes in the above-described UL/DL configurations.

For example, when an NR UL signal is scheduled (allocated to the user terminal) at a timing for transmitting an LTE UL signal, the user terminal may prioritize the transmission of the LTE UL signal. However, if no LTE UL signal is scheduled (or transmitted) at the timing for transmitting an LTE UL signal, the user terminal may transmit an NR UL signal at this timing for transmitting an LTE UL signal.

The UL carrier to transmit UL signals is switched among UL carriers of a number of RATs, over time, so that multiple UL signals of varying RATs can be transmitted properly. In particular, by implementing dual connectivity while cancelling the impact of inter-modulation, downlink signals can be received from an LTE carrier and from an NR carrier, simultaneously.

Because the NR base station needs to know the timings to transmit ACKs/NACKs, the timings to allocate PUSCH, and so on, information about UL transmission timings may be communicated from the LTE radio base station to the NR radio base station, via the X2 interface or the like.

<User-Specific Offset for LTE UL Transmission Time>

When the user terminal executes dual connectivity (DC) between the LTE UL carrier and the NR UL carrier, single-UL communication, in which LTE UL signal transmission and NR UL signal transmission do not overlap in time, is applied (see FIG. 2).

Figure 7:
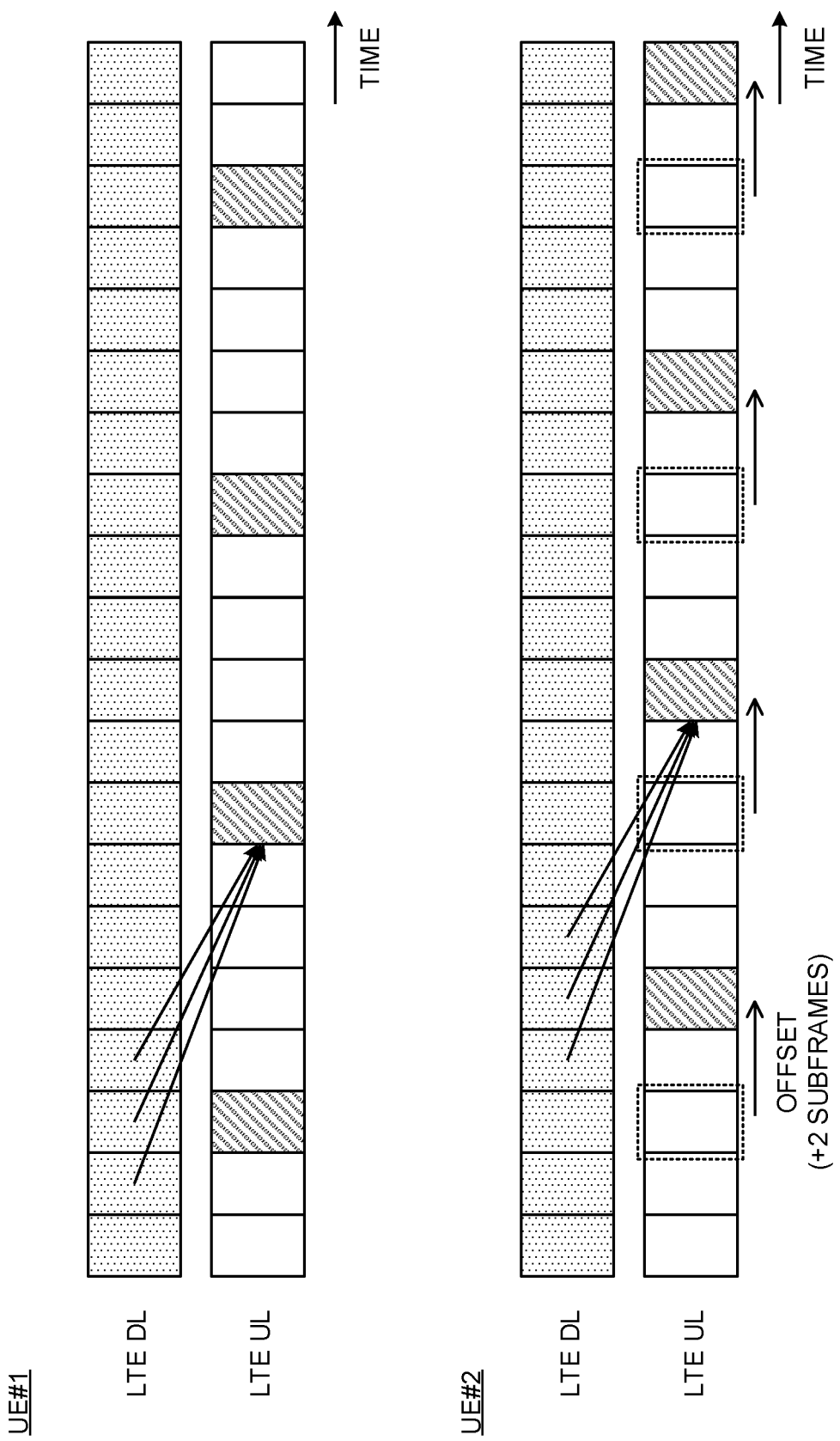
FIG. 7 is a diagram to show examples of user-specific subframe offsets.

When single-UL communication is applied, the time to transmit LTE UL signals may be determined based on user-specific offsets. FIG. 7 shows examples of times to transmit LTE UL signals, determined based on user-specific subframe offsets.

For example, different user-specific subframe offsets are assigned to a first user terminal (UE #1) and a second user terminal (UE #2). Each user shifts the timing (here, subframe) for transmitting an LTE UL signal, from a common LTE UL signal transmission time (transmission timing) that is determined according to predetermined rules, based on a user-specific subframe offset.

Referring to FIG. 7, an offset=0, which requires no shift, is assigned to UE #1, and an offset=2 subframes, which indicates a shift of two subframes, is assigned to UE #2. As a result of this, the subframes to use to transmit LTE UL signals vary between users, so that, from the perspective of the network, more subframes will be available for transmitting LTE UL signals.

Now, regarding the timings for transmitting ACKs/NACKs in response to LTE DL signals and the timings for scheduling PUSCH, it is likely that UL/DL configurations are used as described above. Meanwhile, how to control UL signals other than PUSCH and A/Ns (SR (Scheduling Request), PRACH (Physical Random Access CHannel), SRS (Sounding Reference Signal), etc.) in LTE carriers is not decided yet.

So, regarding the timings for transmitting SR, SRS and PRACH when only limited subframes are available for an LTE UL carrier, the present inventors have come up with the idea of allowing appropriate transmission timings to be determined based on SR configurations, PRACH formats and SRS configurations defined in existing LTE systems (for example, LTE Rel. 14 and earlier versions).

Now, embodiments of the present invention will be described below in detail with reference to the accompanying drawings. Note that, although the following embodiments will assume that one or more LTE carriers and one or more NR carriers are configured for a user terminal, these multiple carriers, according to the herein-contained embodiments, are by no means limited to LTE carriers and NR carriers, as long as they are carriers of varying RATs.

First Example

The first example of the present invention relates to a user terminal, which has a control section that, where there are a scheduling request (SR), a random access preamble and a sounding reference signal (SRS) of the first RAT, controls the transmission of at least the scheduling request, based on UL/DL configurations. LTE will be described as an example of this first RAT, but this is by no means limiting.

The user terminal can control the timings for transmitting scheduling requests based on user terminal-specific time offsets, and SR configurations, in which the timings for transmitting scheduling requests are set forth (proposal 1-1).

Alternatively, the user terminal may control the timings for transmitting scheduling requests based on SR configurations, in which transmission timings that are adjusted in advance based on user terminal-specific time offsets are set forth (proposal 1-2).

In LTE, when requesting a resource, the user terminal transmits a scheduling request to the uplink scheduler (base station). The scheduler receives the scheduling request, and gives a UL grant to the user terminal. As for the resource for transmitting the scheduling request, the user terminal is allocated a PUCCH. The PUCCH for transmitting scheduling requests appears every n subframes.

To be more specific, the timings for transmitting scheduling requests are indicated to the user terminal by using SR configurations. An SR configuration, as shown in FIG. 8, is defined by the periodicity of the PUCCH resource for scheduling requests ($SR_{PERIODICITY}$) and the subframe offset ($N_{OFFSET,SR}$). That is, in an SR configuration, an SR configuration index ($I_{SR}$), a periodicity ($SR_{PERIODICITY}$) and an offset ($N_{OFFSET,SR}$) are associated with each other.

When an index ($I_{SR}$) is reported through higher layer signaling, the user terminal can determine the timings (subframes) for transmitting scheduling requests from the periodicity ($SR_{PERIODICITY}$) and the offset ($N_{OFFSET,SR}$) corresponding to the reported index ($I_{SR}$).

Now, assume the situation where, in FDD, the first UL signal of the first RAT, in which the timings for transmitting delivery acknowledgment information and/or the timings for scheduling UL data are controlled based on UL/DL configurations for use in TDD, and a second UL signal of a second RAT are transmitted at different times. For example, referring to FIG. 1, in the LTE carriers (of the first RAT), FDD is applied between the LTE UL carrier and the LTE DL carrier, and, in addition, TDD based on UL/DL configurations is applied. Furthermore, the situation is assumed here in which timing control for making transmissions at different times is applied between the LTE UL carrier and the NR UL carrier. Referring to FIG. 1, in the NR carriers (of the second RAT), TDD is applied between the NR UL carrier and the NR DL carrier, but the NR carriers may adopt, in addition to TDD operation, other modes of operation such as FDD operation.

In the operation in which transmission timings based on UL/DL configurations set forth for use in TDD are applied to the LTE UL carrier, the LTE UL carrier can be specified using UL/DL configurations 0 to 6, as shown in FIG. 3. For example, when UL/DL configuration 2 is specified, the LTE UL carrier can use subframes #2 and #7 to transmit scheduling requests. The UE thus controls the transmission of SRs using UL subframes configured by UL/DL configurations.

Meanwhile, when user-specific subframe offsets (see FIG. 7) are applied, it is necessary to make changes to the operation policy of the user terminal. To be more specific, the following changes are made in the user terminal.

In this case, in the user terminal, the timings (subframes) for transmitting scheduling requests are specified not only by taking UL/DL configurations 0 to 6 into account, but also by taking user-specific subframe offsets into account (proposal 1-1).

To be more specific, it is assumed here that single-UL communication is applied to the LTE UL carrier because NR carriers are added under the situation where the LTE carriers run FDD operation.

Upon the addition of NR carriers, subframes that are available for the LTE UL carrier are specified to the user terminal by UL/DL configurations (0 to 6). In addition, user-specific subframe offsets are specified by higher layer. For example, when a UL/DL configuration=2 and a user-specific subframe offset=2 subframes are specified, the user terminal determines that subframe #4 (4=subframe #2+offset 2) and subframe #9 (subframe #7+offset 2) are the timings for transmitting scheduling requests in the LTE UL carrier. The user terminal can transmit scheduling requests in subframes #4 and #9 in the LTE UL carrier.

Alternatively, the user terminal can specify the timings (subframes) for transmitting scheduling requests based on SR configurations, in which transmission timings that are adjusted in advance based on user terminal-specific time offsets are set forth (proposal 1-2).

To be more specific, in the base station, the SR configuration is re-designed to reflect user terminal-specific time offsets. That is, the SR configurations is re-designed so that subframes to be specified based on the SR configuration are subframes to reflect user terminal-specific time offsets (that is, subframes shifted based on offsets).

In this case, a new SR configuration is reported from the base station to the user terminal via higher layer. In the user terminal, the SR configuration is re-configured, and the SR configuration that was configured before the NR carriers were added is changed to a new SR configuration that reflects offsets.

In this way, according to the first example, even when user-specific subframe offsets are applied, the timings for transmitting scheduling requests in the LTE UL carrier can be controlled properly.

Second Example

A second example of the present invention relates to a user terminal, which has a control section that, where there are a scheduling request (SR), a random access preamble and a sounding reference signal (SRS) of the first RAT, controls the transmission of at least the random access preamble, based on UL/DL configurations. LTE will be described as an example of this first RAT, but this is by no means limiting.

The user terminal controls the timings for transmitting random access preambles based on random access channel configurations configured for FDD (proposal 2-1).

Alternatively, the user terminal may control the timings for transmitting random access preambles based on random access channel configurations configured for TDD (proposal 2-2).

In LTE, the user terminal requests random access to the network in order to establish uplink synchronization. Random access procedures are comprised of four steps. In step 1 (PRACH transmission/receipt), the user terminal transmits a random access preamble, and the network (base station) estimates the user terminal's transmission timing (delay estimation, etc.). In step 2 (RAR transmission/receipt), a timing advance for adjusting the timing of transmission at the user terminal is transmitted from the network to the user terminal, and uplink resources for use in random access procedures are allocated. In step 3 (transmission/receipt of message 3), the user terminal transmits the terminal indicator to the network, and, in step 4 (transmission/receipt of message 4), the network transmits a contention solution message to the user terminal.

Now, assume the situation where, in FDD, the first UL signal of the first RAT, in which the timings for transmitting delivery acknowledgment information and/or the timings for scheduling UL data are controlled based on UL/DL configurations for use in TDD, and a second UL signal of a second RAT, are transmitted at different times. For example, referring to FIG. 1, assume the situation where, in the LTE carriers (of the first RAT), FDD is applied between the LTE UL carrier and the LTE DL carrier, and, in addition, transmission timings based on UL/DL configurations for use in TDD are applied to the LTE UL carrier.

In the LTE carriers, the user terminal operates based on FDD, in the LTE UL carrier and in the LTE DL carrier, until NR carriers are connected additionally. After that, when NR carriers are connected additionally, performing UL transmission in the LTE UL carrier and the NR UL carrier simultaneously places a heavy load on the user terminal, and so the user terminal switches to single-UL communication, in which LTE UL signals and NR UL signals are controlled to be transmitted at different times.

When this takes place, the timings for transmitting LTE UL signals are reported to the user terminal, and the UL/DL configurations exemplified in FIG. 3 are used as UL transmission timings. That is, although UL and DL of the LTE carriers run in FDD operation until NR carriers are connected additionally, this NR carriers' additional connection triggers the use of transmission timings based on UL/DL configurations for use in TDD in the LTE carriers (FIG. 3 to FIG. 6), while the FDD operation of UL and DL continues.

Focusing on random access procedures, it is assumed that, in the user terminal that has started out in FDD operation, random access channel configurations that are configured for FDD are configured until NR carriers are additionally connected to the user terminal. Consequently, if it becomes necessary to newly establish an uplink in the LTE carriers while the LTE UL carrier and the LTE DL carrier operate based on FDD, the transmission of the random access preamble is controlled based on the random access channel configuration for FDD that is already configured.

Meanwhile, if the additional connection of NR carriers triggers and starts UL transmission timing control based on UL/DL configurations in the LTE carriers, it is necessary to make changes to the operation policy of the user terminal. To be more specific, the following changes are made in the user terminal.

Even when an additional connection of NR carriers triggers and starts, in the LTE carriers, the operation for controlling UL transmission based on UL/DL configurations set forth for TDD, the user terminal continues using the random access channel configurations to be configured for FDD (proposal 2-1).

For example, FIG. 9 shows examples of random access channel configurations that are configured for FDD. In LTE, "frame structure type 1 random access configurations" are defined as random access channel configurations to be configured for FDD.

Random access channel configurations are reported via higher layer and configured in the user terminal. For example, when a random access channel configuration for FDD (frame structure type 1 random access configuration) is reported and configured to start random access procedures, the transmission of the random access preamble is controlled based on the random access channel configuration for FDD.

Note that, when random-access procedures to transmit a random access preamble based on a random access channel configuration for FDD are started, the UL transmission timing control based on UL/DL configurations may be stopped, and the random access procedures may be executed confined within FDD carriers. That is, when random access procedures are started, it is possible to exert control so that the limitations on UL transmission timings due to UL/DL configurations are cancelled in the LTE carriers, and the random access procedures are executed preferentially.

In this way, even when an additional connection of NR carriers triggers and starts UL transmission timing control based on UL/DL configurations in the LTE carriers, the user terminal continues using the random access channel configurations to be configured for FDD. By using random access channel configurations designed for FDD, orthogonality with random access preambles allocated to other user terminals is maintained. Also, since random access channel configurations that are configured for FDD continue being used, there is no need to re-configure random access channel configurations, so that the user terminal's burden can be reduced.

Alternatively, if an additional connection of NR carriers triggers and starts UL transmission timing control based on UL/DL configurations in UL and DL of the LTE carriers, the user terminal may use random access channel configurations that are configured for TDD (proposal 2-2).

In the user terminal that has started out in FDD operation, random access channel configurations to be configured for FDD are used until NR carriers are additionally connected to the user terminal. Then, triggered by the additional connection of NR carriers, the random access channel configuration is switched to a random access channel configuration to be configured for TDD.

For example, FIG. 10 shows examples of random access channel configurations that are configured for TDD. In LTE, "frame structure type 2 random access configurations" are defined as random access channel configurations to be configured for TDD.

In the user terminal, for example, a random access channel configuration for FDD (frame structure type 1 random access configuration) is first configured through higher layer, and, when triggered by an additional connection of NR carriers, a random access channel configuration to be configured for TDD is re-configured.

The base station may configure the random access channel configurations designed for FDD in the user terminal until NR carriers are connected additionally, and, when triggered by an additional connection of NR carriers, re-configure the random access channel configurations designed for TDD in the user terminal. In this case, the base station may re-configure a random access channel configuration for TDD in the user terminal, via higher layer, when triggered by the event of NR carriers' additional connection.

When starting random access procedures after a random access channel configuration for TDD is re-configured, the user terminal controls the transmission of the random access preamble based on the random access channel configuration for TDD. Random access procedures are performed based on the random access channel configuration for TDD, so that TDD operation is still possible even during the period in which the random access procedures are executed. There-fore, it is possible to transmit UL signals in the NR carriers, while executing random access procedures in the LTE carriers.

Also, the base station may configure two of a random access channel configuration for FDD and a random access channel configuration for TDD in the user terminal, and, when triggered by an additional connection of NR carriers, issue a command for switching the random access channel configuration to use to a random access channel configuration for TDD.

In this way, the user terminal switches to and uses random access channel configurations that are configured for TDD when NR carriers are additionally connected. In this way, in the LTE carriers, random access procedures can be executed based on random access channel configurations for TDD, so that scheduling in the NR carriers can be maintained.

Note that in the second example (proposal 2-1 and proposal 2-2), as in the first example, user terminal-specific subframe offsets may be applied to the timings for transmitting LTE UL signals. Furthermore, the timing control for transmitting scheduling requests according to the first example may be applied together.

Third Example

A third example of the present invention relates to a user terminal, which has a control section that, where there are a scheduling request (SR), a random access preamble and a sounding reference signal (SRS) of the first RAT, controls the transmission of at least the SRS, based on UL/DL configurations. LTE will be described as an example of this first RAT, but this is by no means limiting.

The user terminal controls the timings for transmitting SRSs based on SRS configurations that are configured for FDD (proposal 3-1).

Furthermore, the user terminal may control the timings for transmitting SRSs based on SRS configurations that are configured for TDD (proposal 3-2).

In LTE, it is specified that a user terminal transmits SRSs in UL so as to allow the network to estimate channel quality for each frequency. The values of channel quality estimation based on SRSs are used, for example, when the network allocates resource blocks to user terminals. The user terminal transmits SRSs in a predetermined cycle, which ranges from, for example, 2 ms (every two subframes) to 160 ms at a maximum (every sixteen subframes). An SRS is transmitted using the final symbol of a subframe. In addition, an SRS needs to be communicated so as to cover the whole frequency band that is subject to frequency-domain scheduling.

For example, referring to FIG. 1, assume the situation where, in the LTE carriers (of the first RAT), FDD is applied between the LTE UL carrier and the LTE DL carrier, and TDD based on UL/DL configurations is applied between the LTE UL carrier and the LTE DL carrier.

In the LTE carriers, the user terminal operates based on FDD, in the LTE UL carrier and in the LTE DL carrier, until NR carriers are connected additionally. After that, when NR carriers are connected additionally, the user terminal switches to single-UL communication, in which LTE UL signals and NR UL signals are controlled to be transmitted at different times. At this time, the timings for transmitting LTE UL signals are reported to the user terminal, and the UL/DL configurations exemplified in FIG. 3 are used.

That is, although UL and DL of the LTE carriers run in FDD operation until NR carriers are connected additionally, this NR carriers' additional connection triggers and introduces UL transmission timing control based on UL/DL configurations for use in TDD, in the LTE carriers, while the FDD operation of UL and DL continues.

Focusing on SRS transmission, it is assumed that, in the user terminal, which has started out in FDD operation, SRS configurations to be configured for FDD are configured until NR carriers are additionally connected to the user terminal. Consequently, in the LTE carriers, if it becomes necessary to transmit an SRS while the LTE UL carrier and the LTE DL carrier operate based on FDD, the transmission of the SRS is controlled based on the SRS configuration for FDD that is already configured.

Meanwhile, if the additional connection of NR carriers triggers and starts UL transmission timing control based on UL/DL configurations in the LTE carriers, it is necessary to make changes to the operation policy of the user terminal. To be more specific, the following changes are made in the user terminal.

Even when the additional connection of NR carriers triggers and starts the use of UL transmission timings based on UL/DL configurations in the LTE carriers, the user terminal continues using the SRS configurations that are configured for FDD (proposal 3-1).

For example, FIG. 11 shows examples of SRS configurations that are configured for FDD. In LTE, "frame structure type 1 sounding reference signal subframe configurations" are defined as SRS configurations to be configured for FDD.

SRS configurations are reported via higher layer and configured in the user terminal. For example, an SRS configuration for FDD (frame structure type 1 sounding reference signal subframe configuration) is reported and configured, the transmission of SRSs is controlled based on the SRS configuration for FDD.

Note that, as mentioned earlier, UL and DL of the LTE carriers run in FDD operation until NR carriers are connected additionally, and the additional connection of NR carriers triggers and introduces UL transmission timing control based on UL/DL configurations in the LTE carriers, while the FDD operation of UL and DL continues.

In this case, the timings (subframes) for transmitting UL signals in the LTE carriers are specified by UL/DL configurations (0 to 6). The user terminal is controlled to transmit SRSs only if there are opportunities to transmit SRSs in UL subframes that are specified by the UL/DL configurations (0 to 6). That is, the configuration is assumed here in which SRSs are not allowed to be transmitted (for example, SRSs are dropped) in other subframes.

In this way, even when an additional connection of NR carriers triggers and starts TDD operation in UL and DL of the LTE carriers, the user terminal continues using the SRS configurations that are configured for FDD. By using SRS configurations designed for FDD, orthogonality with SRSs allocated to other user terminals that run in LTE FDD operation is maintained. Also, since SRS configurations that are configured for FDD continue being used, there is no need to re-configure SRS configurations, so that the user terminal's burden can be reduced.

Alternately, if an additional connection of NR carriers triggers and starts, in the LTE carriers, UL transmission timing control based on UL/DL configurations, the user terminal may use the SRS configurations to be configured for TDD (proposal 3-2).

In the user terminal that has started out in FDD operation, SRS configurations to be configured for FDD are used until NR carriers are additionally connected to the user terminal. Then, when triggered by an additional connection of NR carriers, the SRS configuration is switched to an SRS configuration to be configured for TDD.

For example, FIG. 12 shows examples of SRS configurations to be configured for TDD. In LTE, "frame structure type 2 sounding reference signal subframe configurations" are defined as SRS configurations to be configured for TDD.

In the user terminal, for example, an SRS configuration for FDD is first configured through higher layer, and, when triggered by an additional connection of NR carriers, an SRS configuration to be configured for TDD is re-configured.

The base station may configure the SRS configurations designed for FDD in the user terminal until NR carriers are connected additionally, and, when triggered by an additional connection of NR carriers, re-configure the SRS configurations for TDD in the user terminal. In this case, the base station, triggered by the event of NR carriers' additional connection, re-configures an SRS configuration for TDD in the user terminal, via higher layer.

When transmitting an SRS after the SRS configuration for TDD is re-configured, the user terminal controls the transmission of the SRS based on the SRS configuration for TDD. Given that the transmission of the SRS is controlled based on the SRS configuration for TDD, the SRS can be transmitted in a UL subframe based on the UL/DL configuration (and needs not be dropped).

Also, the base station may configure two of an SRS configuration for FDD and an SRS configuration for TDD in the user terminal, and, when triggered by an additional connection of NR carriers, issue a command for switching the SRS configuration to use, to an SRS configuration for TDD.

In this way, NR carriers are additionally connected, the user terminal starts using SRS configurations to be configured for TDD, so that the user terminal can transmit SRSs in subframes specified by UL/DL configurations, and maximize the opportunities for transmitting SRSs.

Note that, in the third example (proposal 3-1 and proposal 3-2), as in the first example, user terminal-specific subframe offsets may be applied to the timings for transmitting LTE UL signals. In addition, the timing control for transmitting scheduling requests according to the first example and/or the transmission control for random access preambles according to the second example may be applied together.

(Radio Communication System)

Now, the structure of a radio communication system according to an embodiment of the present invention will be described below. In this radio communication system, each radio communication method according to the above-described embodiments is employed. Note that the radio communication methods according to the herein-contained examples of the present disclosure may be applied individually, or may be combined and applied.

Figure 13:
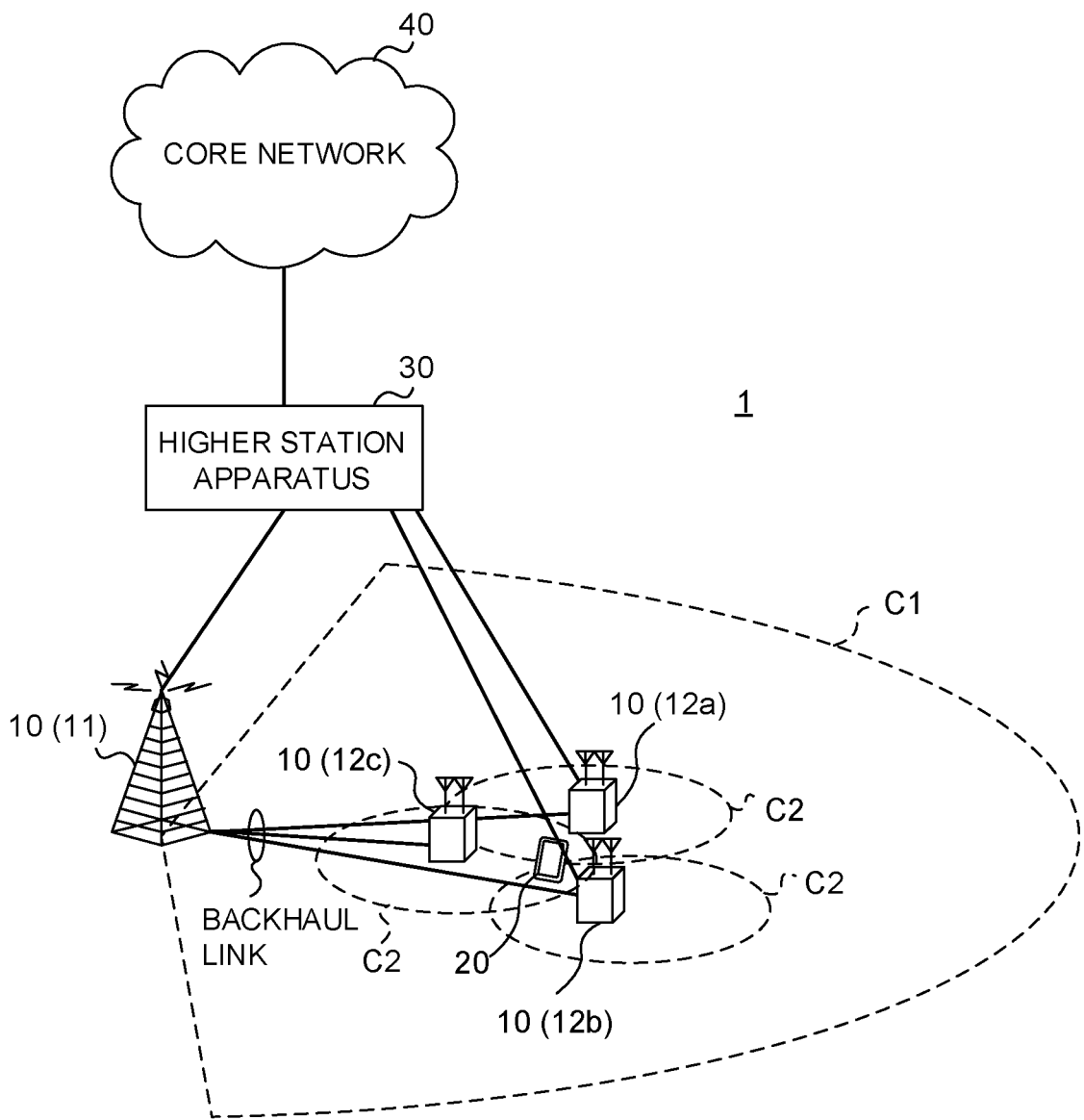
FIG. 13 is a diagram to show an exemplary schematic structure of a radio communication system according to the present embodiment.

FIG. 13 is a diagram to show an exemplary schematic structure of a radio communication system according to the present embodiment. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit. Note that the radio communication system 1 may be a non-stand-alone type (NR NSA), in which an existing RAT (for example, SUPER 3G, LTE-A (LTE-Advanced), IMT-Advanced or 4G) and a new RAT (for example, 5G, FRA (Future Radio Access) or NR (New RAT)) coordinate and run together.

The radio communication system 1 shown in FIG. 13 includes a radio base station 11 that forms a macro cell C1 and radio base stations 12a to 12c that are placed within the macro cell C1 and form small cells C2, which are narrower than the macro cell C1. Also, user terminals 20 are placed in the macro cell C1 and in each small cell C2. A structure in which different RATs and/or numerologies are used between cells may be adopted. Note that numerologies may be RAT-specific communication parameters (for example, at least one of the subcarrier spacing, the length of symbols, the length of CPs and the length of TTIs).

The user terminals 20 can connect with both the radio base station 11 and the radio base stations 12. The user terminals 20 may use the macro cell C1 and the small cells C2, which use different frequencies, at the same time, by means of CA or DC. Also, the user terminals 20 can run CA or DC by using a plurality of cells (CCs) (for example, two or more CCs). Furthermore, the user terminals can use licensed-band CCs and unlicensed-band CCs as a plurality of cells.

Furthermore, the user terminal 20 can perform communication using time division duplexing (TDD) or frequency division duplexing (FDD) in each cell. A TDD cell and an FDD cell may be referred to as a "TDD carrier (frame configuration type 2)," and an "FDD carrier (frame configuration type 1)," respectively.

Also, in each cell (carrier), one or both of a TTI having a relatively long time length (for example, 1 ms) (also referred to as a "subframe," a "normal TTI," a "long TTI," a "normal subframe," a "long subframe" a "slot," etc.) and a TTI having a relatively short time length (also referred to as a "short TTI," a "short subframe," a "slot," a "subslot" a "minislot," etc.) may be used. Also, in each cell, TTIs of different time lengths may co-exist.

Between the user terminals 20 and the radio base station 11, communication can be carried out using a carrier of a relatively low frequency band (for example, 2 GHz) (referred to as, for example, an "existing carrier," a "legacy carrier" and so on). Meanwhile, carriers of higher frequency bands than existing carriers (for example, 3.5 GHz, 5 GHz, 30 to 70 GHz, etc.), or carriers of the same frequency band as existing carriers may be used between the user terminal 20 and the radio base station 12. Note that the structure of the frequency band for use in each radio base station is by no means limited to these.

The radio base station 11 and a radio base station 12 (or two radio base stations 12) may be connected with each other by cables (for example, by optical fiber, which is in compliance with the CPRI (Common Public Radio Interface), the X2 interface and so on), or by radio.

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but these are by no means limiting. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations each having a local coverage, and may be referred to as "small base stations," "micro base stations," "pico base stations," "femto base stations," "HeNBs (Home eNodeBs)," "RRHs (Remote Radio Heads)," "transmitting/receiving points" and so on.

Also, the LTE base station (LTE eNB) shown in FIG. 1 may be a radio base station 11 and/or a radio base station 12.

Also, the NR base station (NR gNB) may be a radio base station 11 and/or a radio base station 12. Hereinafter, the radio base stations 11 and 12 will be collectively referred to as "radio base stations 10," unless specified otherwise.

Each user terminal 20 is a terminal that supports one or more RATs such as at least one of LTE, LTE-A, NR, and 5G, and may not be limited to a mobile communication terminal, and may be a stationary communication terminal.

In the radio communication system 1, as radio access schemes, OFDMA (orthogonal Frequency Division Multiple Access) can be applied to the downlink (DL), and SC-FDMA (Single-Carrier Frequency Division Multiple Access) can be applied to the uplink (UL). OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands that are each formed with one or contiguous resource blocks, per terminal, and allowing a plurality of terminals to use mutually different bands. Note that the uplink and downlink radio access schemes are not limited to the combinations of these, and OFDMA may be used in UL.

In the radio communication system 1, a DL data channel (also referred as a PDSCH (Physical Downlink Shared CHannel), a DL shared channel, and so on), which is used by each user terminal 20 on a shared basis, a broadcast channel (PBCH (Physical Broadcast CHannel)), L1/L2 control channels and so on are used as DL channels. User data, higher layer control information, SIBs (System Information Blocks) and so on are communicated in the PDSCH. Also, the MIB (Master Information Block) is communicated in the PBCH.

The L1/L2 control channels include at least one of DL control channels (also referred to as a "PDCCH (Physical Downlink Control CHannel)," an "EPDCCH (Enhanced Physical Downlink Control CHannel)," an "NR-PDCCH," etc.), a PCFICH (Physical Control Format Indicator CHannel), a PHICH (Physical Hybrid-ARQ Indicator CHannel) and so on. Downlink control information (DCI), which includes PDSCH and/or PUSCH scheduling information and so on, is communicated via the PDCCH. The number of OFDM symbols to use for the PDCCH is communicated by the PCFICH. The EPDCCH is frequency-division-multiplexed with the PDSCH and used to communicate DCI and so on, like the PDCCH. PUSCH delivery acknowledgment information (also referred to as "A/N," "HARQ-ACK," "HARQ-ACK bit," "A/N codebook" and so on) can be communicated by using at least one of the PHICH, the PDCCH and the EPDCCH.

In the radio communication system 1, a UL data channel (also referred to as a "PUSCH (Physical Uplink Shared CHannel)," a "UL shared channel," an "NR-PUSCH," etc.), which is used by each user terminal 20 on a shared basis, a UL control channel (PUCCH (Physical Uplink Control CHannel), NR-PUCCH, etc.), a random access channel (PRACH (Physical Random Access CHannel)) and so on are used as UL channels. User data, higher layer control information and so on are communicated by the PUSCH. Uplink control information (UCI), including at least one of PDSCH delivery acknowledgement information (A/N, HARQ-ACK, etc.), channel state information (CSI), a scheduling request (SR) and so on are communicated in the PUSCH or the PUCCH. By means of the PRACH, random access preambles for establishing connections with cells are communicated.

(Radio Base Station)

Figure 14:
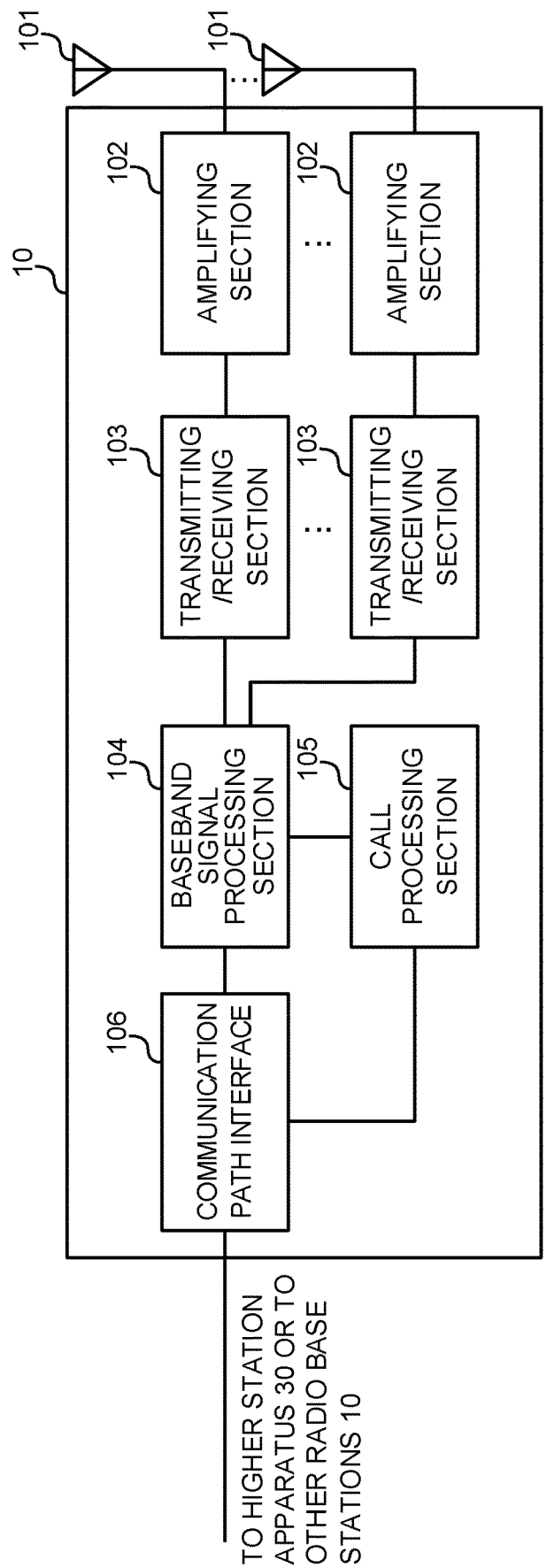
FIG. 14 is a diagram to show an exemplary overall structure of a radio base station according to the present embodiment.

FIG. 14 is a diagram to show an exemplary overall structure of a radio base station according to the present embodiment. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided. The radio base station 10 may be either an LTE base station or an NR base station.

User data to be transmitted from the radio base station 10 to a user terminal 20 on the downlink is input from the higher station apparatus 30, to the baseband signal processing section 104, via the communication path interface 106.

In the baseband signal processing section 104, the user data is subjected to transmission processes, including a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, rate matching, scrambling, an inverse fast Fourier transform (IFFT) process and a precoding process, and the result is forwarded to each transmitting/receiving section 103. Furthermore, downlink control signals are also subjected to transmission processes such as channel coding and/or an inverse fast Fourier transform, and forwarded to each transmitting/receiving section 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101.

A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for UL signals, radio frequency signals that are received in the transmitting/receiving antennas 101 are each amplified in the amplifying sections 102. The transmitting/receiving sections 103 receive the UL signals amplified in the amplifying sections 102. The received signals are converted into the baseband signal through frequency conversion in the transmitting/receiving sections 103 and output to the baseband signal processing section 104.

In the baseband signal processing section 104, UL data that is included in the UL signals that are input is subjected to a fast Fourier transform (FFT) process, an inverse discrete Fourier transform (IDFT) process, error correction decoding, a MAC retransmission control receiving process, and RLC layer and PDCP layer receiving processes, and the result is forwarded to the higher station apparatus 30 via the communication path interface 106. The call processing section 105 at least performs call processing such as setting up and releasing communication channels, manages the state of the radio base station 10 or manages the radio resources.

The communication path interface section 106 transmits and receives signals to and from the higher station apparatus 30 via a predetermined interface. Also, the communication path interface 106 may transmit and receive signals (backhaul signaling) with other radio base stations 10 via a backhaul link (which is, for example, optical fiber in compliance with the CPRI (Common Public Radio Interface), the X2 interface, etc.). In the present embodiment, the communication path interface 106 can constitute a transmission section and/or a receiving section that transmits and/or receives signals between other radio base stations 10.

Also, the transmitting/receiving sections 103 transmit DL signals (for example, at least one of DCI (DL assignment to schedule DL data, and/or UL grant to schedule UL data), DL data and DL reference signals) by using an LTE DL carrier and/or an NR DL carrier. Also, the transmitting/receiving sections 103 receive multiple UL signals (for example, at least one of UL data, UCI and UL reference signals) of different RATs, at different times, by using each of an LTE UL carrier and an NR UL carrier.

The DL signals may include LTE DL signals and/or NR DL signals. The UL signals may include LTE UL signals and/or NR UL signals.

Also, the transmitting/receiving sections 103 receive delivery acknowledgement information (also referred to as "ACK/NACK," "A/N," "HARQ-ACK," "A/N codebook," etc.) in response to DL signals (LTE DL signals and/or NR DL signals). As to how often this delivery acknowledgement information is transmitted, for example, the delivery acknowledgement information may be transmitted per CBG, per TB or for every one or more TBs (that is, ACKs or NACKs may be indicated per CBG, per TB or for every one or more TBs). In addition, the transmitting/receiving sections 103 may transmit configuration information for the unit for retransmission of DL signals and/or UL signals.

Also, the communication path interface 106 of the LTE base station may transmit, a MAC signal, which carries UCI/UL data for NR, received on the LTE UL carrier, to the NR base station, via a backhaul link. Also, the communication path interface 106 of the LTE base station may transmit NR control information to the NR base station, via a backhaul link (for example, the X2 interface). The communication path interface 106 of the NR base station may receive MAC signals and/or NR control information, from the LTE base station, via a backhaul link.

Figure 15:
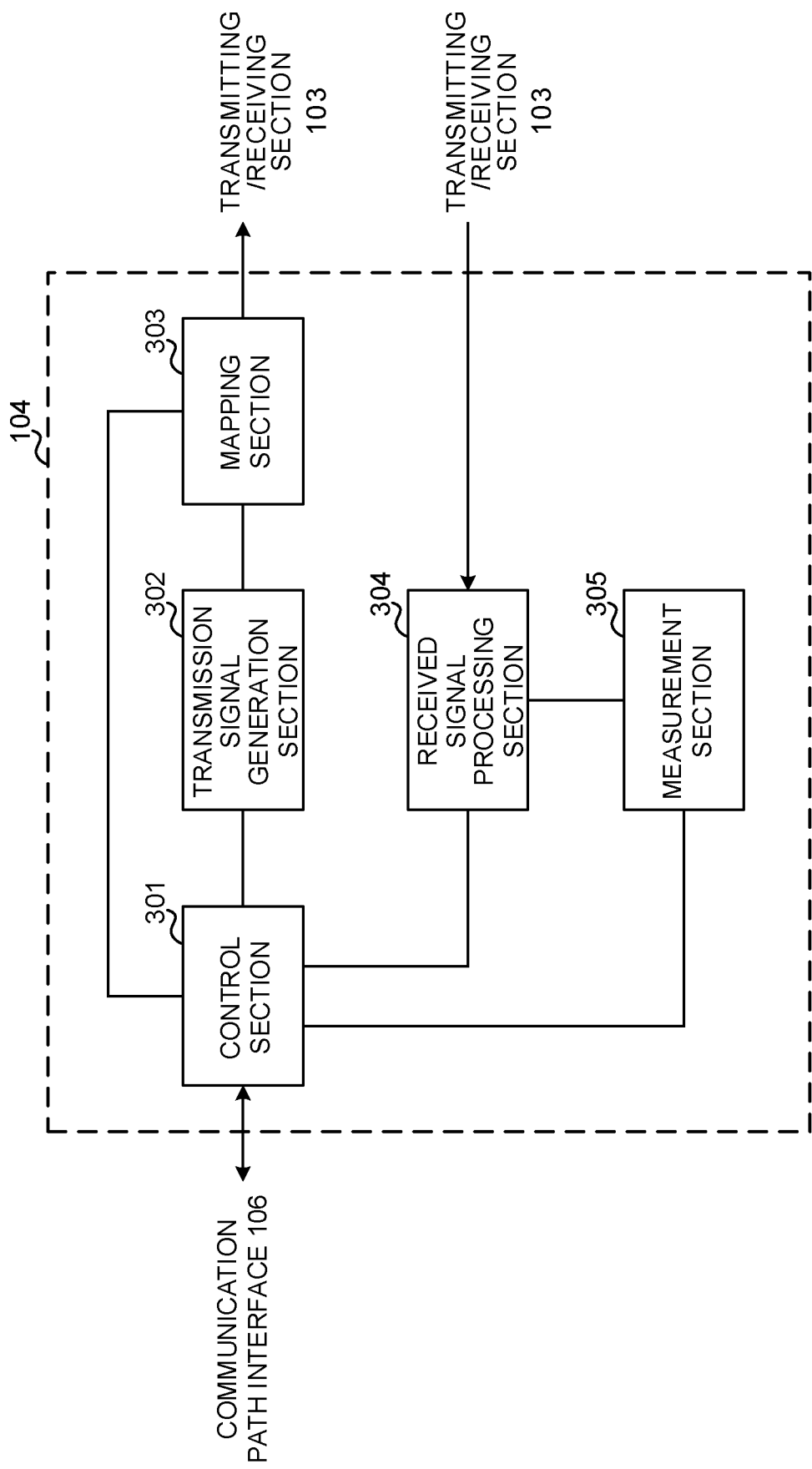
FIG. 15 is a diagram to show an exemplary functional structure of a radio base station according to the present embodiment.

FIG. 15 is a diagram to show an exemplary functional structure of a radio base station according to the present embodiment. Note that, although FIG. 12 primarily shows functional blocks that pertain to characteristic parts of the present embodiment, the radio base station 10 has other functional blocks that are necessary for radio communication as well. As shown in FIG. 15, the baseband signal processing section 104 has a control section 301, a transmission signal generation section 302, a mapping section 303, a received signal processing section 304 and a measurement section 305. Each MAC entity of the present embodiment may be constituted by at least one of a control section 301, a transmission signal generation section 302, and a received signal processing section 304.

The control section 301 controls the whole of the radio base station 10. The control section 301 controls, for example, at least one of the generation of DL signals in the transmission signal generation section 302, the mapping of DL signals in the mapping section 303, the receiving process (for example, demodulation) of UL signals in the received signal processing section 304, and the measurements in the measurement section 305.

To be more specific, the control section 301 controls the scheduling and/or transmission processes (for example, modulation, coding, transport block size (TBS), etc.) for DL signals based on UCI that is transmitted as feedback from the user terminal 20. Also, when the TBS exceeds a predetermined threshold, the control section 301 may apply code block segmentation to DL signals, whereby a TBS is divided into multiple CBs.

The control section 301 also controls the scheduling of UL signals based on UCI that is transmitted as feedback from the user terminal 20. The control section 301 also controls receiving process (for example, at least one of demodulation, decoding, and carrier demultiplexing) for the UL signals. For example, the control section 301 controls receiving processes for LTE UL signals and NR UL signals by using an LTE UL carrier and an NR UL carrier, respectively.

The control section 301 also controls switching between the time to receive LTE UL signals and/or transmit LTE DL signals using LTE carriers, and the time to receive NR UL signals and/or transmit NR DL signals using NR carriers.

To be more specific, the control section 301 may control the dual connection with the LTE DL carrier, which is used to transmit LTE DL signals, and the NR DL carrier, which is used to transmit NR DL signals. Also, the control section 301 may control switching between the time to receive LTE UL signals using the LTE UL carrier and the time to receive NR UL signal using the NR UL carrier.

Also, when the LTE UL carrier and the LTE DL carrier are subject to frequency division duplexing (FDD), the control section 301 may determine at least one of the time to receive LTE UL signals, the timing for receiving delivery acknowledgement information in response to LTE DL signals, and the timing for scheduling LTE UL signals based on UL/DL configurations for use in time division duplexing (TDD).

Also, the control section 301 may report user terminal-specific time offsets to the user terminal, via RRC signaling (proposal 1-1). Also, the control section 301 may report SR configurations, in which transmission timings that are adjusted in advance based on user terminal-specific time offsets are set forth, to the user terminal, via RRC signaling (proposal 1-2). To be more specific, SR configurations are re-designed so that subframes reflect user terminal-specific time offsets (that is, subframes are shifted based on offsets), and new SR configurations are configured in the user terminal via higher layer.

In addition, the control section 301 may configure the user terminal with random access channel configurations configured for FDD (proposal 2-1). In addition, the control section 301 may configure the user terminal with random access channel configurations configured for TDD (proposal 2-2). To be more specific, the control section 301 may configure the random access channel configurations designed for FDD in the user terminal until NR carriers are connected additionally, and, when triggered by an additional connection of NR carriers, re-configure the random access channel configurations designed for TDD in the user terminal. In this case, the control section 301, triggered by the event of NR carriers' additional connection, re-configures the random access channel configurations for TDD, in the user terminal, via higher layer.

Also, the control section 301 may configure the SRS configurations that are configured for FDD in the user terminal (proposal 3-1). Furthermore, the control section 301 may configure the SRS configurations that are configured for TDD in the user terminal (proposal 3-2). In this case, the control section 301 may configure the SRS configurations designed for FDD in the user terminal until NR carriers are connected additionally, and, when triggered by an additional connection of NR carriers, re-configure the SRS configurations for TDD in the user terminal. In this case, the control section 301, triggered by the event of NR carriers' additional connection, re-configure an SRS configuration for TDD in the user terminal, via higher layer.

The control section 301 can be constituted by a controller, a control circuit or control apparatus that can be described based on general understanding of the technical field to which the present invention pertains.

The transmission signal generation section 302 may generate a DL signal (including at least one of DL data, DCI, a DL reference signal and control information that is provided by way of higher layer signaling) based on commands from the control section 301, and output this signal to the mapping section 303.

The transmission signal generation section 302 can be constituted by a signal generator, a signal generating circuit or signal generating apparatus that can be described based on general understanding of the technical field to which the present invention pertains.

The mapping section 303 maps the DL signals generated in the transmission signal generation section 302, to predetermined radio resources, based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, at least one of demapping, demodulation, decoding, carrier demultiplexing, etc.) for the UL signals that are transmitted from the user terminal 20. Also, the received signal processing section 304 outputs the received signals and/or the signals after the receiving processes to the measurement section 305. In addition, the received signal processing section 304 performs UCI receiving processes based on UL control channel configuration indicated from the control section 301.

Also, the measurement section 305 may measure the channel quality in UL based on, for example, the received power (for example, RSRP (Reference Signal Received Power)) and/or the received quality (for example, RSRQ (Reference Signal Received Quality)) of UL reference signals. The measurement results may be output to the control section 301.

(User Terminal)

Figure 16:
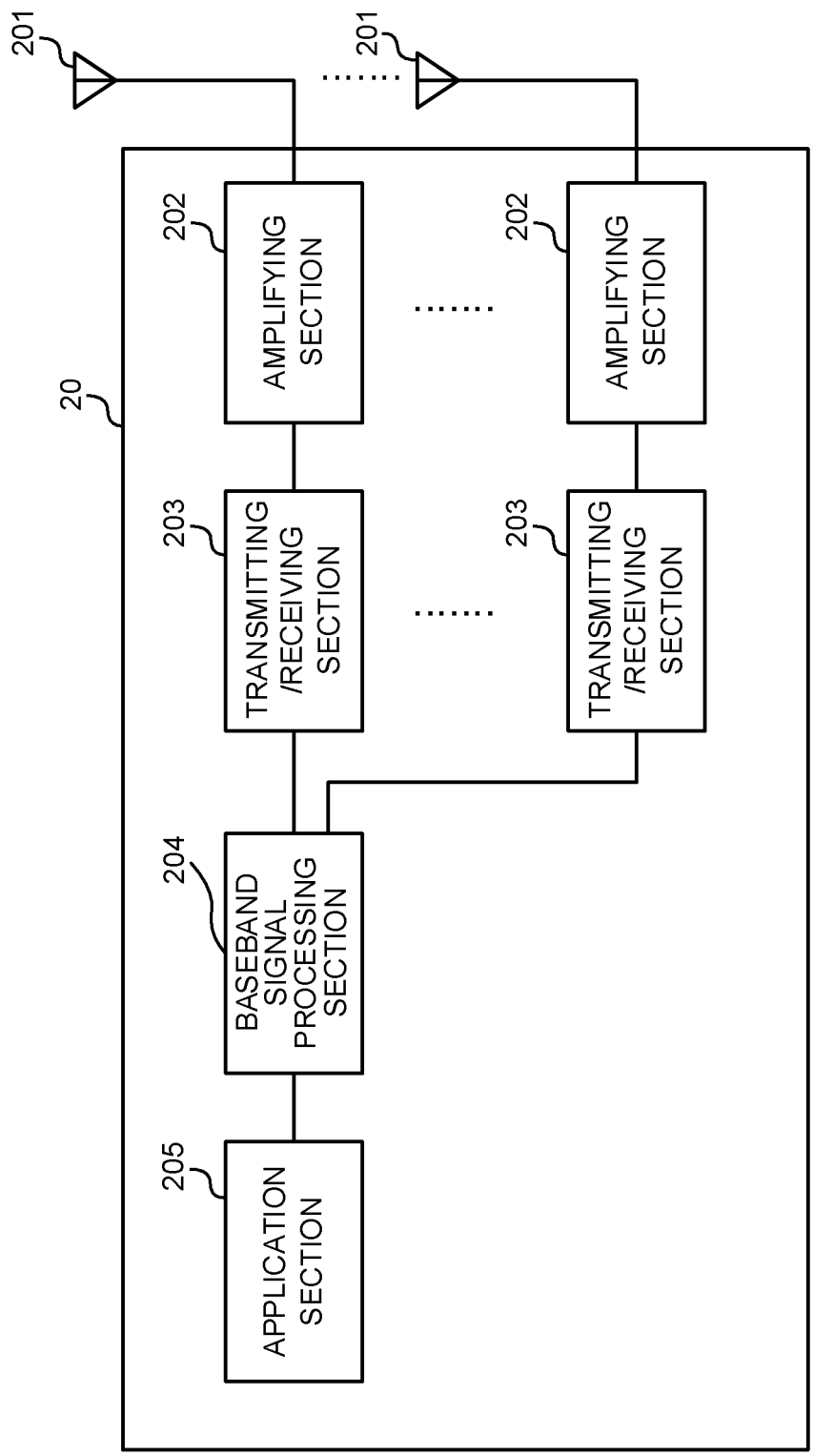
FIG. 16 is a diagram to show an exemplary overall structure of a user terminal according to the present embodiment.

FIG. 16 is a diagram to show an exemplary overall structure of a user terminal according to the present embodiment. A user terminal 20 has a plurality of transmitting/receiving antennas 201 for MIMO transmission, amplifying sections 202, transmitting/receiving sections 203, a baseband signal processing section 204, and an application section 205. The user terminal 20 supports multiple RATs (for example, LTE and NR).

Radio frequency signals that are received by the multiple transmitting/receiving antennas 201 are amplified in the amplifying sections 202. The transmitting/receiving sections 203 each receive the DL signals amplified in the amplifying sections 202. The received signals are subjected to frequency conversion and converted into the baseband signal in the transmitting/receiving sections 203, and output to the baseband signal processing section 204.

The baseband signal processing section 204 performs, for the baseband signal that is input, at least one of an FFT process, error correction decoding, a retransmission control receiving process and so on. The DL data is forwarded to the application section 205. The application section 205 performs processes related to higher layers above the physical layer and the MAC layer, and so on.

Meanwhile, UL data is input from the application section 205 to the baseband signal processing section 204. The baseband signal processing section 204 performs at least one of a retransmission control process (for example, an HARQ transmission process), channel coding, rate matching, puncturing, a discrete Fourier transform (DFT) process, an IFFT process and so on, and the result is forwarded to each transmitting/receiving section 203. UCI (which may be, for example, at least one of an A/N in response to a DL signal, channel state information (CSI), a scheduling request (SR) and the like) is also subjected to at least one of channel coding, rate matching, puncturing, a DFT process, an IFFT process and so on, and the result is forwarded to the transmitting/receiving sections 203.

Baseband signals that are output from the baseband signal processing section 204 are converted into a radio frequency band in the transmitting/receiving sections 203, and transmitted. The radio frequency signals that are subjected to frequency conversion in the transmitting/receiving sections 203 are amplified in the amplifying sections 202, and transmitted from the transmitting/receiving antennas 201.

Also, the transmitting/receiving sections 203 receive DL signals (for example, at least one of DCI (DL assignment for scheduling DL data, and/or UL grant for scheduling UL data), DL data, and DL reference signals), by using an LTE DL carrier and/or an NR DL carrier. Also, the transmitting/receiving sections 203 transmit a plurality of UL signals (for example, at least one of UL data, UCI and UL reference signals) of different RATs, at different times, by using the LTE UL carrier and the NR UL carrier, respectively.

The DL signals may include LTE DL signals and/or NR DL signals. The UL signals may include LTE UL signals and/or NR UL signals.

Also, the transmitting/receiving sections 203 transmit delivery acknowledgement information (also referred to as "ACK/NACK," "A/N," "HARQ-ACK," "A/N codebook," etc.) in response to DL signals (LTE DL signals and/or NR DL signals). As to how often this delivery acknowledgement information is transmitted, for example, the delivery acknowledgement information may be transmitted either per CBG or per TB, or for every one or more TBs (that is, ACKs or NACKs may be indicated either per CBG or per TB, or for every one or more TBs). In addition, the transmitting/receiving sections 203 may receive configuration information for the unit for retransmission of DL signals and/or UL signals.

A transmitting/receiving section 203 can be constituted by a transmitter/receiver, a transmitting/receiving circuit or transmitting/receiving apparatus that can be described based on general understanding of the technical field to which the present invention pertains. Furthermore, a transmitting/receiving section 203 may be structured as one transmitting/receiving section, or may be formed with a transmitting section and a receiving section.

Figure 17:
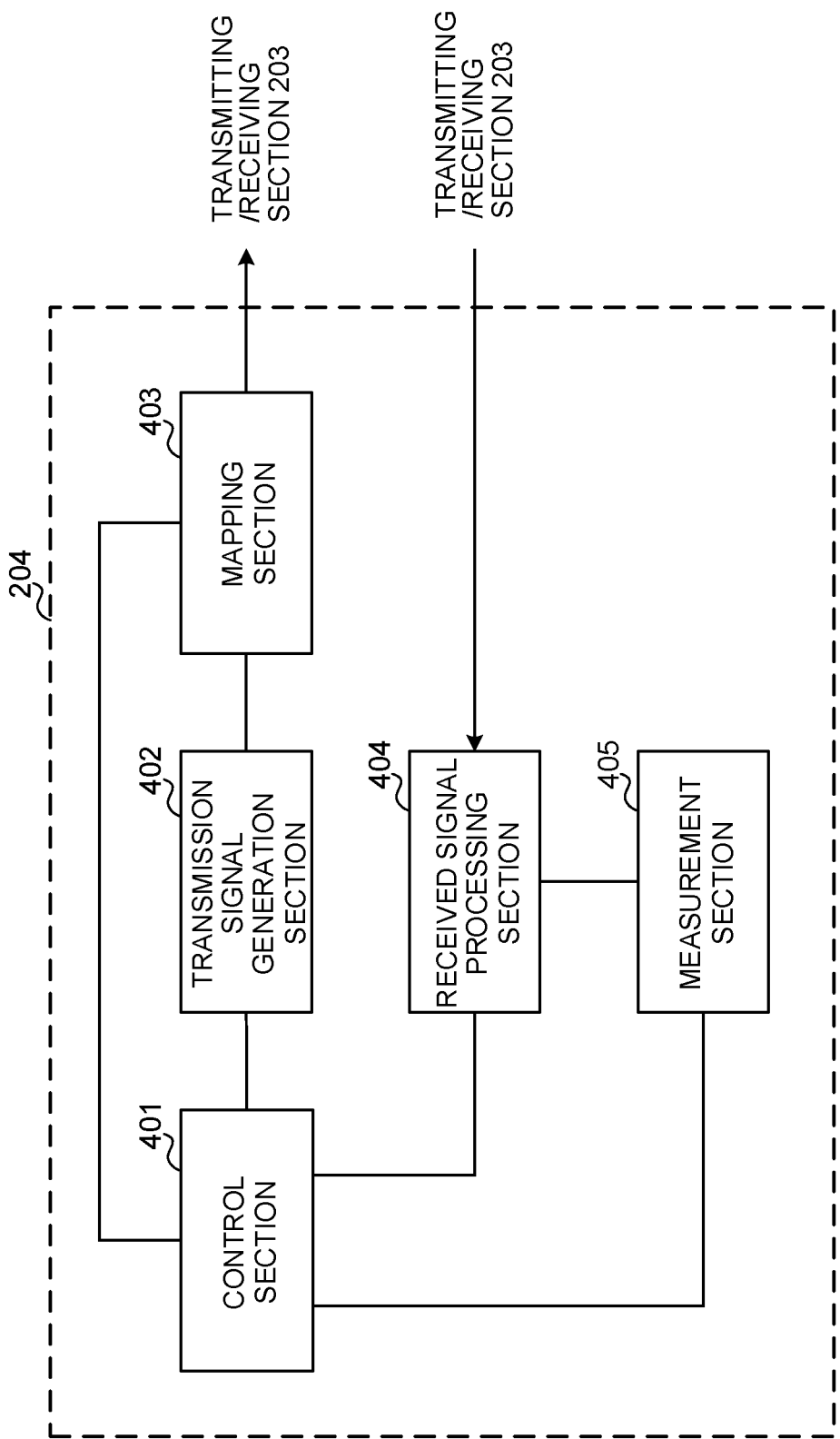
FIG. 17 is a diagram to show an exemplary functional structure of a user terminal according to the present embodiment.

FIG. 17 is a diagram to show an exemplary functional structure of a user terminal according to the present embodiment. Note that, although FIG. 17 primarily shows functional blocks that pertain to characteristic parts of the present embodiment, the user terminal 20 may have other functional blocks that are necessary for radio communication as well. Each MAC entity of the present embodiment may be constituted by at least one of a control section 401, a transmission signal generation section 402, and a received signal processing section 404.

As shown in FIG. 17, the baseband signal processing section 204 provided in the user terminal 20 at least has a control section 401, a transmission signal generation section 402, a mapping section 403, a received signal processing section 404, and a measurement section 405. Each MAC entity of the present embodiment may be constituted by at least one of a control section 301, a transmission signal generation section 302, and a received signal processing section 304.

The control section 401 controls the whole of the user terminal 20. The control section 401 controls, for example, at least one of generation of UL signals in the transmission signal generation section 402, mapping of UL signals in the mapping section 403, the receiving process of DL signals in the received signal processing section 404 and measurements in the measurement section 405.

To be more specific, the control section 401 controls receiving processes for DL signals in the received signal processing section 404 (for example, demodulation, decoding, each carrier's demultiplexing, etc.) based on DCI (DL assignment).

Also, the control section 401 controls the generation and transmission processes (for example, encoding, modulation, mapping etc.) of UL signals based on DCI (UL grant).

The control section 401 also controls switching between the time to transmit LTE UL signals and/or receive LTE DL signals using LTE carriers, and the time to transmit NR UL signals and/or receive NR DL signals using NR carriers.

To be more specific, the control section 401 may control the dual connection with an LTE DL carrier, which is used to receive LTE DL signals, and an NR DL carrier, which is used to receive NR DL signals. The control section 401 may also control switching between the time to transmit LTE UL signals using the LTE UL carrier and the time to transmit NR UL signals using the NR UL carrier.

Also, when the LTE UL carrier and the LTE DL carrier are subject to frequency division duplexing (FDD), the control section 401 may determine at least one of the time to transmit LTE UL signals, the timing for transmitting delivery acknowledgment information in response to LTE DL signals, and the timing for scheduling LTE UL signals based on UL/DL configurations for use in time division duplexing (TDD) (see FIG. 3).

Also, when the LTE UL carrier and the LTE DL carrier are subject to frequency division duplexing (FDD), the control section 401 may determine the time to transmit NR UL signals based on UL/DL configurations.

Also, the control section 401 may control the granularity of retransmission of NR DL signals. For example, the control section 401 may control the granularity of NR A/N based on TBs, as with LTE A/N, or the control section 401 may control the granularity of NR A/N based on CBGs, unlike LTE A/N. Also, the control section 401 may control the bundling of NR A/N and/or LTE A/N.

Also, the control section 401 may control the transmission power of UL signals. For example, the control section 401 may control the transmission power of LTE UL signals, transmitted in the LTE UL carrier, based on the path loss of the LTE carriers. Furthermore, the control section 401 may control the transmission power of NR UL signals, transmitted in the NR UL carrier, based on the path loss of the LTE carriers. Also, the control section 401 may control the priority of UCI for LTE and/or UCI for NR.

Furthermore, the control section 401 may control the timings for transmitting scheduling requests based on user terminal-specific time offsets and SR configurations, in which scheduling request transmission timings are set forth (proposal 1-1). To be more specific, when NR carriers are added in the situation where LTE carriers run in FDD operation, subframes that are available for the LTE UL carrier are specified by UL/DL configurations (0 to 6), and, furthermore, user-specific subframe offsets are specified through higher layer. For example, when UL/DL configuration=2 and user-specific subframe offset=two subframes are specified, the control section 401 determines subframes #4 (4=subframe #2+offset 2) and subframe #9 (subframe #7+offset 2) as timings for transmitting scheduling request in the LTE UL carrier. The control section 401 exerts control so that scheduling requests are transmitted in subframes #4 and #9 in the LTE UL carrier.

Furthermore, the control section 401 may control the timings for transmitting scheduling requests based on an SR configuration, in which transmission timings that are adjusted in advance based on user terminal-specific time offsets are set forth (proposal 1-2). To be more specific, a new SR configuration is reported to the control section 401 via higher layer, and this new SR configuration is re-configured. By this means, the SR configuration that was configured before the NR carriers were added is changed to the new SR configuration that reflects the offset.

Furthermore, the control section 401 controls the timings for transmitting random access preambles based on random access channel configurations that are configured for FDD (proposal 2-1). To be more specific, random access channel configurations reported via higher layer are configured. For example, when a random access channel configuration for FDD (frame structure type 1 random access configuration) is reported and configured, and random access procedures are started, the transmission of the random access preamble is controlled based on the random access channel configuration for FDD. Note that, when random access procedures to transmit the random access preamble based on a random access channel configuration for FDD are started, TDD operation may be stopped, and the random access procedures may be executed confined within the FDD carrier.

In addition, the control section 401 may control the timings for transmitting random access preambles based on random access channel configurations that are configured for TDD (proposal 2-2). To be more specific, the control section 401 re-configures random access channel configurations for TDD, which are reported via higher layers, when triggered by the event in which an NR carrier is connected additionally. When random access procedures are started after a random access channel configuration for TDD is re-configured, the control section 401 controls the transmission of random access preambles based on random access channel configurations for TDD.

Furthermore, the control section 401 controls the timings for transmitting SRSs based on SRS configurations that are configured for FDD (proposal 3-1). To be more specific, SRS configurations for FDD, which are reported via higher layer, are reported and configured in the control section 401, and the control section 401 controls the transmission of SRSs transmission based on SRS configurations for FDD. Furthermore, the control section 401 may control the timings for transmitting SRSs based on SRS configurations that are configured for TDD (proposal 3-2). To be more specific, when an SRS configuration for FDD is configured first via higher layer, and, triggered by an additional connection of NR carriers, an SRS configuration to be configured for TDD is re-configured. When transmitting an SRS after the SRS configuration for TDD is re-configured, the control section 401 controls the transmission of the SRS based on the SRS configuration for TDD. The transmission of the SRS is controlled based on an SRS configuration for TDD, so that UL signals can be transmitted using the NR carrier.

The control section 401 can be constituted by a controller, a control circuit or control apparatus that can be described based on general understanding of the technical field to which the present invention pertains.

The transmission signal generation section 402 generates delivery acknowledgment information in response to UL and DL signals (for example, coding, rate matching, puncturing, modulation, etc.), SRs, random access preambles, and SRSs based on commands from the control section 401, and outputs these to the mapping section 403. The transmission signal generation section 402 can be constituted by a signal generator, a signal generating circuit, or signal generation apparatus that can be described based on general understanding of the technical field to which the present invention pertains.

The mapping section 403 maps the delivery acknowledgment information in response to UL signals and DL signals generated in the transmission signal generation section 402, to radio resources, based on commands from the control section 401, and outputs these to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes for DL signals (for example, demapping, demodulation, decoding, etc.). For example, the received signal processing section 404 may perform the decoding process on a per CB basis as commanded from the control section 401, and output the decoding result of each CB to the control section 401.

The received signal processing section 404 outputs the information received from the radio base station 10, to the control section 401. The received signal processing section 404 outputs, for example, broadcast information, system information, higher layer control information by higher layer signaling such as RRC signaling, L1/L2 control information (for example, UL grant, DL assignment, etc.) and so on to the control section 401.

The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The measurement section 405 measures channel states based on reference signals (for example, CSI-RS) from the radio base station 10, and outputs the measurement results to the control section 401. Note that the channel state measurements may be conducted per CC.

The measurement section 405 can be constituted by a signal processor, a signal processing circuit or signal processing apparatus, and a measurer, a measurement circuit or measurement apparatus that can be described based on general understanding of the technical field to which the present invention pertains.

(Hardware Structure)

Note that the block diagrams that have been used to describe the above embodiment show blocks in functional units. These functional blocks (components) may be implemented in arbitrary combinations of hardware and/or software. Also, means for implementing each functional block is not particularly limited. That is, each functional block may be realized by one piece of apparatus that is physically and/or logically aggregated, or may be realized by directly and/or indirectly connecting two or more physically and/or logically-separate pieces of apparatus (by using cables and/or radio, for example) and using these multiple pieces of apparatus.

Figure 18:
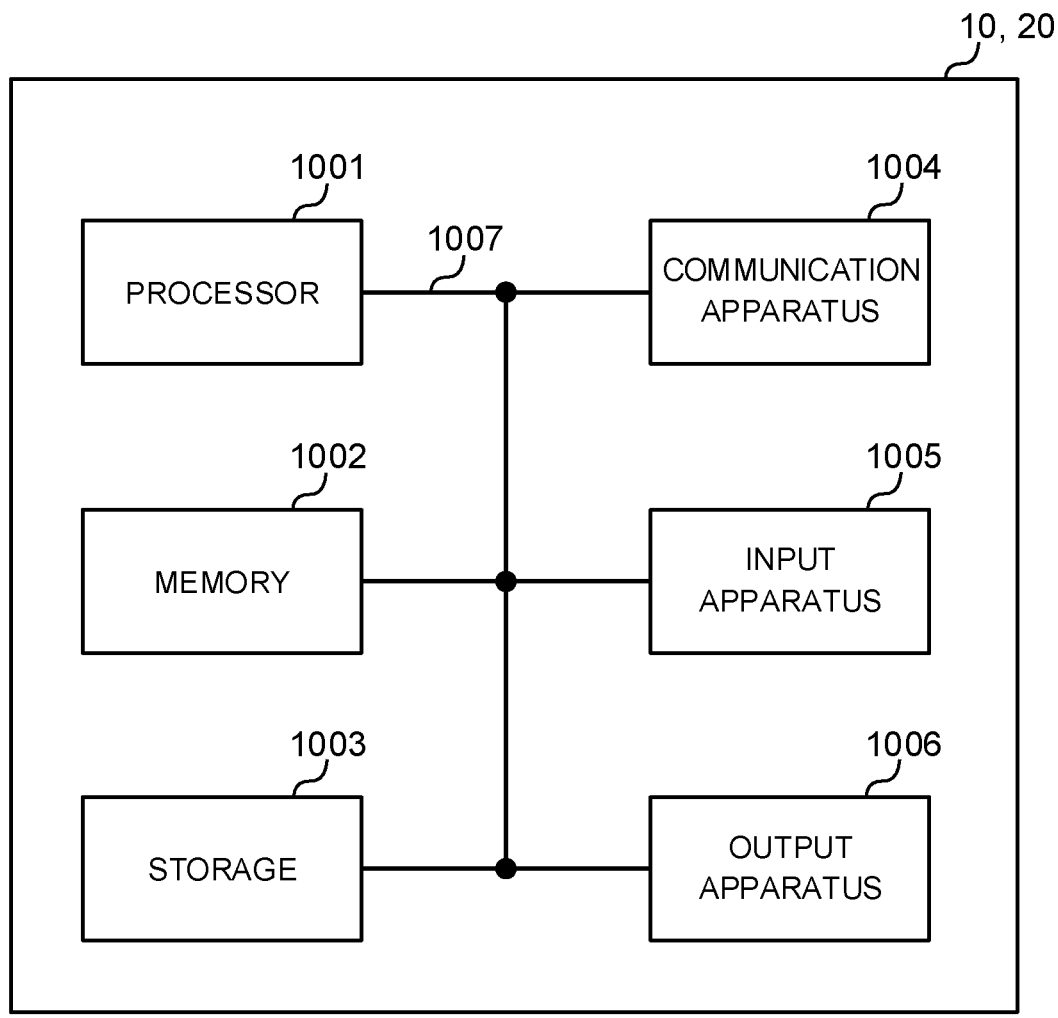
FIG. 18 is a diagram to show an exemplary hardware structure of a radio base station and a user terminal according to the present embodiment.

For example, the radio base station, the user terminal and so on according to the present embodiment may function as a computer that executes the processes of the radio communication method of the present invention. FIG. 18 is a diagram to show an exemplary hardware structure of a radio base station and a user terminal according to the present embodiment. Physically, the above-described radio base stations 10 and user terminals 20 may be formed as a computer apparatus that includes a processor 1001, a memory 1002, a storage 1003, communication apparatus 1004, input apparatus 1005, output apparatus 1006, a bus 1007 and so on.

Note that, in the following description, the term "apparatus" may be interpreted as "circuit," "device," "unit" and so on. Note that, the hardware structure of a radio base station 10 and a user terminal 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented simultaneously or in sequence, or by using different techniques, on one or more processors. Note that the processor 1001 may be implemented with one or more chips.

Each function of the radio base station 10 and the user terminal 20 is implemented by, for example, loading predetermined software programs) on hardware such as the processor 1001 and the memory 1002, and allowing the processor 1001 to do calculations, and control at least one of the communication by the communication apparatus 1004, the reading and writing of data in the memory 1002 and the storage 1003 and so on.

The processor 1001 may control the whole computer by, for example, running an operating system. The processor 1001 may be constituted by a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules, data and so forth from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory), and other appropriate storage media. The memory 1002 may be referred to as a "register," a "cache," a "main memory (primary storage apparatus)," and so on. The memory 1002 can store executable programs (program codes), software modules and so on for implementing the radio communication methods according to an embodiment of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) or the like), a digital versatile disc, a Blu-ray (registered trademark) disk, etc.), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using cable and/or wireless networks, and may be referred to as, for example, a "network device," a "network controller," a "network card," a "communication module," and so on. The communication apparatus 1004 may be configured to include a high frequency switch, a duplexer, a filter, a frequency synthesizer and so on, in order to implement, for example, frequency division duplexing (FDD) and/or time division duplexing (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from outside (for example, a keyboard, a mouse, a microphone, a switch, a button, a sensor and so on). The output apparatus 1006 is an output device for allowing sending output to outside (for example, a display, a speaker, an LED (Light Emitting Diode) lamp and so on). Note that the input apparatus 1005 and the output apparatus 1006 may be provided in an integrated structure (for example, a touch panel).

Also, each device shown in FIG. 18 is connected by a bus 1007 for communicating information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by these pieces of hardware. For example, the processor 1001 may be implemented with at least one of these pieces of hardware.

(Variations)

Note that, the terminology used in this specification and the terminology that is needed to understand this specification may be replaced by other terms that communicate the same or similar meanings. For example, a "channel" and/or a "symbol" may be replaced by a "signal" (or "signaling"). Also, a "signal" may be a "message." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Furthermore, a radio frame may be comprised of one or more periods (frames) in the time domain. One or more periods (frames) that constitute a radio frame may be each referred to as a "subframe." Furthermore, a subframe may be comprised of one or more slots in the time domain. A subframe may be a fixed time duration (for example, 1 ms), which does not depend on numerology.

A slot may be comprised of one or more symbols in the time domain (OFDM (Orthogonal Frequency Division Multiplexing) symbols, SC-FDMA (Single Carrier Frequency Division Multiple Access) symbols and so on). Also, a slot may be a time unit based on numerology. Also, a slot may include a plurality of mini-slots. Each mini-slot may be comprised of one or more symbols in the time domain.

A radio frame, a subframe, a slot, a mini-slot, and a symbol all refer to a unit of time in signal communication. A radio frame, a subframe, a slot, a mini-slot, and a symbol may be each called by other applicable names. For example, one subframe may be referred to as a "transmission time interval (TTI)," or a plurality of contiguous subframes may be referred to as a "TTI," or one slot or one mini-slot may be referred to as a "TTI." That is, a subframe and/or a TTI may be a subframe (1 ms) in existing LTE, may be a shorter period than 1 ms (for example, one to thirteen symbols), or may be a longer period of time than 1 ms.

Here, a TTI refers to the minimum time unit for scheduling in radio communication, for example. For example, in LTE systems, a radio base station schedules the radio resources (such as the frequency bandwidth and/or transmission power each user terminal can use) to allocate to each user terminal in TTI units. Note that the definition of TTIs is not limited to this. The TTI may be the transmission time unit of channel-encoded data packets (transport blocks), or may be the unit of processing in scheduling, link adaptation and so on. Note that, when one slot or one mini-slot is referred to as a "TTI," one or more TTIs (that is, one or more slots or one or more mini-slots) may be the minimum time unit of scheduling. Also, the number of slots (the number of mini-slots) to constitute this minimum time unit for scheduling may be controlled.

A TTI having a time length of 1 ms may be referred to as a "normal TTI (TTI in LTE Rel. 8 to 12)," a "long TTI," a "normal subframe," a "long subframe," and so on. A TTI that is shorter than a normal TTI may be referred to as a "shortened TTI," a "short TTI," a "partial TTI (or a "fractional TTI")," a "shortened subframe," a "short subframe," and so on.

A resource block (RB) is the unit of resource allocation in the time domain and the frequency domain, and may include one or more contiguous subcarriers in the frequency domain. Also, an RB may include one or more symbols in the time domain, and may be one slot, one mini-slot, one subframe or one TTI in length. One TTI and one subframe may be each comprised of one or more resource blocks. Note that an RB may be referred to as a "physical resource block (PRB (Physical RB))," a "PRB pair," an "RB pair," and so on.

Furthermore, a resource block may be comprised of one or more resource elements (REs). For example, one RE may be a radio resource field of one subcarrier and one symbol.

Note that the structures of radio frames, subframes, slots, mini-slots, symbols and so on described above are simply examples. For example, configurations pertaining to the number of subframes included in a radio frame, the number of slots per subframe or radio frame, the number of mini-slots included in a slot, the number of symbols included in a slot or a mini-slot, the number of subcarriers included in an RB, the number of symbols in a TTI, the duration of symbols, the length of cyclic prefixes (CPs) and so on can be variously changed.

Also, the information and parameters described in this specification may be represented in absolute values or in relative values with respect to predetermined values, or may be represented using other applicable information. For example, radio resources may be specified by predetermined indices. In addition, equations and/or the like to use these parameters may be used, apart from those explicitly disclosed in this specification.

The names used for parameters and so on in this specification are in no respect limiting. For example, since various channels (PUCCH (Physical Uplink Control CHannel), PDCCH (Physical Downlink Control CHannel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers, and/or from lower layers to higher layers. Information, signals and so on may be input and/or output via a plurality of network nodes.

The information, signals and so on that are input and/or output may be stored in a specific location (for example, in a memory), or may be managed using a control table. The information, signals and so on to be input and/or output can be overwritten, updated, or appended. The information, signals and so on that are output may be deleted. The information, signals and so on that are input may be transmitted to other pieces of apparatus.

Reporting of information is by no means limited to the aspects/embodiments described in this specification, and other methods may be used as well. For example, reporting of information may be implemented by using physical layer signaling (for example, downlink control information (DCI), uplink control information (UCI)), higher layer signaling (for example, RRC (Radio Resource Control) signaling, broadcast information (the master information block (MIB), system information blocks (SIBs) and so on), MAC (Medium Access Control) signaling, etc.), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an "RRC connection setup message," "RRC connection reconfiguration message," and so on. Also, MAC signaling may be reported using, for example, MAC control elements (MAC CEs (Control Elements)).

Also, predetermined information (for example, an indication to the effect "X holds") does not necessarily have to be indicated explicitly, and may be indicated in an implicit way (for example, by not reporting this predetermined piece of information, by reporting another piece of information and so on).

Decisions may be made in values represented by one bit (0 or 1), may be made in Boolean values that represent true or false, or may be made by comparing numerical values (for example, comparison against a predetermined value).

Software, whether referred to as "software," "firmware," "middleware," "microcode," or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, instructions, information and so on may be transmitted and received via communication media. For example, when software is transmitted from a website, a server or other remote sources by using wired technologies (coaxial cables, optical fiber cables, twisted-pair cables, digital subscriber lines (DSL) and so on), and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)," "user terminal," "user equipment (UE)," and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other suitable terms.

Furthermore, the radio base stations in this specification may be interpreted as "user terminals." For example, the examples/embodiments of the present invention may be applied to a configuration in which communication between a radio base station and a user terminal is replaced with communication among a plurality of user terminals (D2D (Device-to-Device)). In this case, user terminals 20 may have the functions of the radio base stations 10 described above. In addition, "uplink" and/or "downlink" may be interpreted as "sides." For example, an "uplink channel" may be interpreted as a "side channel."

Likewise, the user terminals in this specification may be interpreted as "radio base stations." In this case, the radio base stations 10 may have the functions of the user terminals 20 described above.

Certain actions which have been described in this specification to be performed by base stations may, in some cases, be performed by their upper nodes. In a network comprised of one or more network nodes with base stations, it is clear that various operations that are performed to communicate with terminals can be performed by base stations, one or more network nodes other than base stations (for example, MMEs (Mobility Management Entities), S-GWs (Serving-Gateways) and so on may be applicable, but these are not limiting) or combinations of these.

The examples/embodiments illustrated in this specification may be used individually or in combinations, which may be switched depending on the mode of implementation. The order of processes, sequences, flowcharts and so on that have been used to describe the examples/embodiments herein may be re-ordered as long as inconsistencies do not arise. For example, although various methods have been illustrated in this specification with various components of steps in exemplary orders, the specific orders that are illustrated herein are by no means limiting.

The examples/embodiments illustrated in this specification may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), and other adequate radio communication methods, and/or next-generation systems that are enhanced based on these.

The phrase "based on" as used in this specification does not mean "based only on" unless otherwise specified. In other words, the phrase "based on" means both "based only on" and "based at least on."

Reference to elements with designations such as "first," "second" and so on as used herein does not generally limit the number/quantity or order of these elements. These designations are used herein only for convenience, as a method for distinguishing between two or more elements. In this way, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database, or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical, or a combination of these. As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in radio frequency fields, microwave regions and optical (both visible and invisible) regions.

When terms such as "include," "comprise" and variations of these are used in this specification or in claims, these terms are intended to be inclusive, in a manner similar to the way the term "provide" is used. Furthermore, the term "or" as used in this specification or in claims is intended not to be an exclusive disjunction.

Now, although the present invention has been described in detail above, it should be obvious to a person skilled in the art that the present invention is by no means limited to the embodiments described herein. The present invention can be implemented with various corrections and modifications, without departing from the spirit and scope of the present invention defined by the recitations of claims. Consequently, the description herein is provided only for the purpose of explaining examples, and should by no means be construed to limit the present invention in any way.

The invention claimed is:

1. A terminal comprising:
a receiver that receives, by higher layer, first information about transmission conditions for a first uplink (UL) signal, the first information indicating aperiodicity of a scheduling request and an offset for the scheduling request, and receives second information indicating an index specifying a UL/DL configuration showing configuration of UL subframes and downlink (DL) subframes in a radio frame among a plurality of UL/DL configurations; and
a processor that, when dual connectivity using a first radio access technology and a second radio access technology is configured, uses a frequency division duplexing (FDD) cell using FDD for the first radio access technology and controls, based on the periodicity of the scheduling request, the offset of the scheduling request and the UL/DL configuration specified by the index, a transmission of the first UL signal, at a transmission timing based on at least one of the UL subframes indicated in the UL/DL configuration in the FDD cell using the FDD,
wherein the receiver further receives, by higher layer, third information about transmission conditions for a UL channel, the third information indicating a random access channel configuration configured for the FDD, and the processor, when the dual connectivity is configured, uses the FDD cell using the FDD, and controls a transmission of the UL channel, at the transmission timing based on at least one of the UL subframes in the UL/DL configuration in the FDD cell, using the FDD, based on the random access channel configuration configured for the FDD and the UL/DL configuration specified by the index.

2. The terminal according to claim 1, wherein the processor determines, based on the first information and the UL/DL configuration, the transmission timing at which the first UL signal can be transmitted in the FDD cell using the FDD, or determines, based on the third information and the UL/DL configuration, the transmission timing at which the UL channel can be transmitted in the FDD cell using the FDD.

3. The terminal according to claim 1, wherein the receiver further receives, by higher layer, fourth information about transmission conditions for a second UL signal, the fourth information indicating a sounding reference signal configuration configured for the FDD, and the processor, when the dual connectivity is configured, uses the FDD cell using the FDD, and controls a transmission of the second UL signal, at the transmission timing based on at least one of the UL subframes in the UL/DL configuration in the FDD cell, using the FDD, based on the sounding reference signal configuration configured for the FDD and the UL/DL configuration specified by the index.

4. The terminal according to claim 1, wherein the processor determines, based on the UL/DL configuration and a subframe offset, the transmission timing at which the UL channel or the first UL signal can be transmitted in the FDD cell using the FDD.

5. A radio communication method, performed by a terminal, comprising:
receiving, by higher layer, first information about transmission conditions for a first uplink (UL) signal, the first information indicating aperiodicity of a scheduling request and an offset for the scheduling request;
receiving second information indicating an index specifying a UL/DL configuration showing configuration of UL subframes and downlink (DL) subframes in a radio frame among a plurality of UL/DL configurations;
when dual connectivity using a first radio access technology and a second radio access technology is configured, using a frequency division duplexing (FDD) cell using FDD for the first radio access technology and
controlling, based on the periodicity of the scheduling request, the offset of the scheduling request and the UL/DL configuration specified by the index, a transmission of the first UL signal at a transmission timing based on at least one of the UL subframes in the UL/DL configuration in the FDD cell using the FDD,
wherein the method further comprises receiving, by higher layer, third information about transmission conditions for a UL channel, the third information indicating a random access channel configuration configured for the FDD, and controlling, when the dual connectivity is configured, uses the FDD cell using the FDD, a transmission of the UL channel, at the transmission timing based on at least one of the UL subframes in the UL/DL configuration in the FDD cell, using the FDD, based on the random access channel configuration configured for the FDD and the UL/DL configuration specified by the index.

6. A base station comprising:
a transmitter that transmits, by higher layer, first information about transmission conditions for a first uplink (UL) signal, the fir information indicating a periodicity of a scheduling request and an offset for the scheduling request, and transmits second information indicating an index specifying a UL/DL configuration showing configuration of UL subframes and downlink (DL) subframes in a radio frame among a plurality of UL/DL configurations; and
a processor that, when dual connectivity using a first radio access technology and a second radio access technology is configured, configures a frequency division duplexing (FDD) cell using FDD for the first radio access technology and controls, based on the periodicity of the scheduling request, the offset of the scheduling request and the UL/DL configuration specified by the index, a reception of the first UL signal transmitted at a transmission timing based on at least one of the UL subframes in the UL/DL configuration in the FDD cell using the FDD, wherein the transmitter further transmits, by higher layer, third information about transmission conditions for a UL channel, the third information indicating a random access channel configuration configured for the FDD, and the processor, when the dual connectivity is configured, uses the FDD cell using the FDD, controls a reception of the UL channel, at the transmission timing based on at least one of the UL subframes in the UL/DL configuration in the FDD cell, using the FDD, based on the random access channel configuration configured for the FDD and the UL/DL configuration specified by the index.

7. The terminal according to claim 2, wherein the receiver further receives, by higher layer, fourth information about transmission conditions for a second UL signal, the fourth information indicating a sounding reference signal configuration configured for the FDD, and the processor, when the dual connectivity is configured, uses the FDD cell using the FDD, controls a transmission of the second UL signal, at the transmission timing based on at least one of the UL subframes in the UL/DL configuration in the FDD cell, using the FDD, based on the sounding reference signal configuration configured for the FDD and the UL/DL configuration specified by the index.

8. The terminal according to claim 2, wherein the processor determines, based on the UL/DL configuration and a subframe offset, the transmission timing at which the UL channel or the first UL signal can be transmitted in the FDD cell using the FDD.

9. The terminal according to claim 3, wherein the processor determines, based on the UL/DL configuration and a subframe offset, the transmission timing at which the UL channel or the first UL signal or the second UL signal can be transmitted in the FDD cell using the FDD.

10. A system comprising: a terminal; and abase station, wherein the terminal comprises:
  a receiver that receives, by first higher layer, first information about transmission conditions for a first uplink (UL) signal, the first information indicating a periodicity of a scheduling request and an offset for the scheduling request, and receives second information indicating an index specifying a UL/DL configuration showing configuration of UL subframes and downlink (DL) subframes in a radio frame among a plurality of UL/DL configurations; and a processor of the terminal that, when dual connectivity using a first radio access technology and a second radio access technology is configured, uses a frequency division duplexing (FDD) cell using FDD for the first radio access technology, and controls, based on the periodicity of the scheduling request, the offset of the scheduling request and the UL/DL configuration specified by the index, a transmission of the first UL signal at a transmission timing based on at least one of the UL subframes the UL/DL configuration in the FDD cell using the FDD, wherein the receiver further receives, by second higher layer, third information about transmission conditions for a UL channel, the third information indicating a random access channel configuration configured for the FDD, and the processor, when the dual connectivity is configured, uses the FDD cell using the FDD, controls a transmission of the UL channel, at the transmission timing based on at least one of the UL subframes in the UL/DL configuration in the FDD cell, using the FDD, based on the random access channel configuration configured for the FDD and the UL/DL configuration specified by the index; and the base station comprises:
  a transmitter that transmits, by the first higher layer, the first information about the transmission conditions for the first UL signal and transmits the second information indicating the index; and a processor of the base station that, when the dual connectivity using the first radio access technology and the second radio access technology is configured, configures the FDD cell using the FDD for the first radio access technology and controls, based on the periodicity of the scheduling request, the offset of the scheduling request and the UL/DL configuration specified by the index, a reception of the first UL signal transmitted at the transmission timing based on at least one of the UL subframes the UL/DL configuration in the FDD cell using the FDD, wherein the transmitter further transmits, by the second higher layer, the third information about the transmission conditions for the UL channel, and the processor of the base station, when the dual connectivity is configured, uses the FDD cell using the FDD, and controls, based on the random access channel configuration configured for the FDD and the UL/DL configuration specified by the index, a reception of the UL channel, at the transmission timing based on at least one of the UL subframes in the UL/DL configuration in the FDD cell, using the FDD.

* * * * *